March 20, 1962 — F. A. SWANSON — 3,025,642
HONING APPARATUS
Filed June 6, 1958 — 12 Sheets-Sheet 3

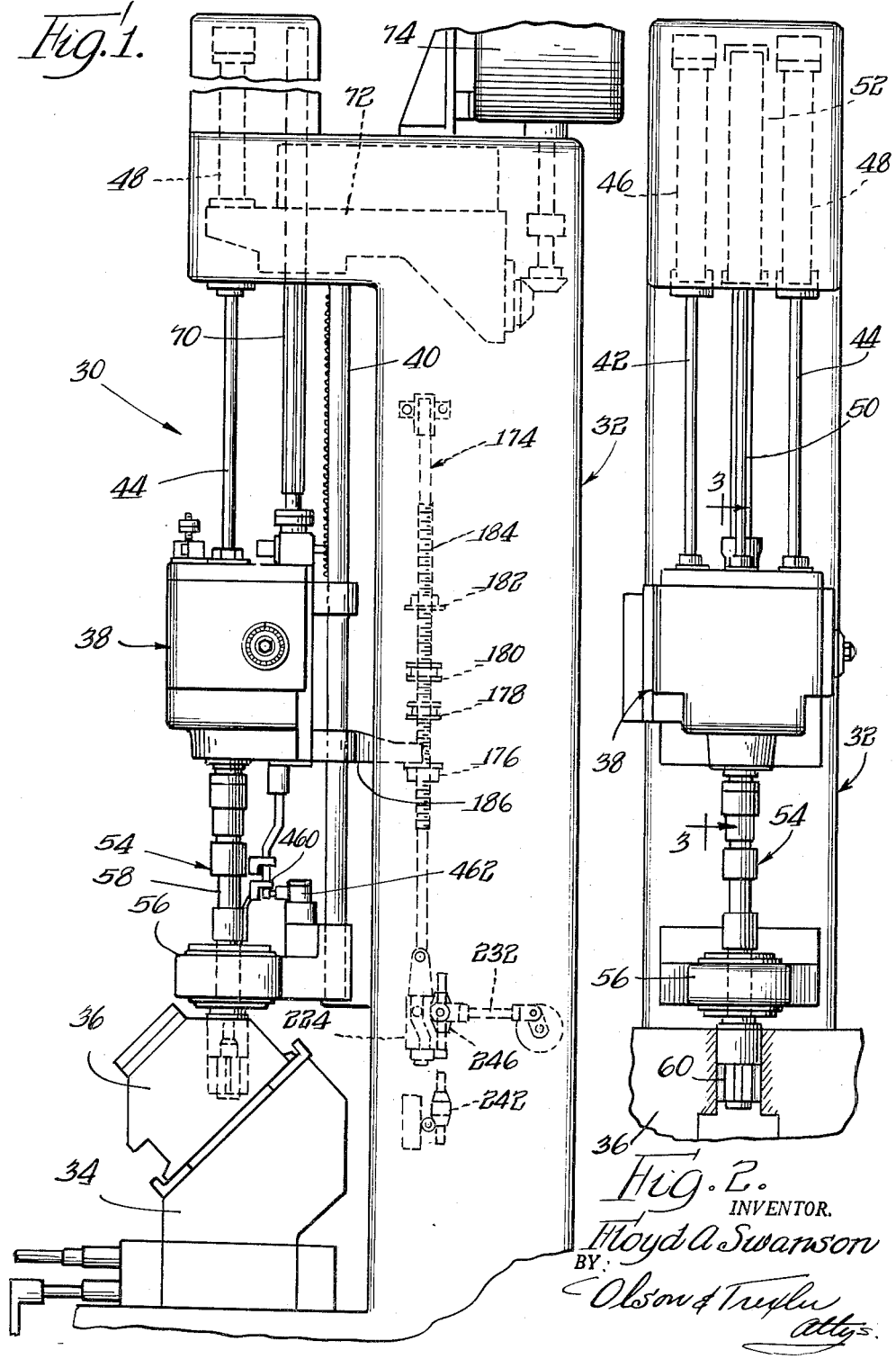

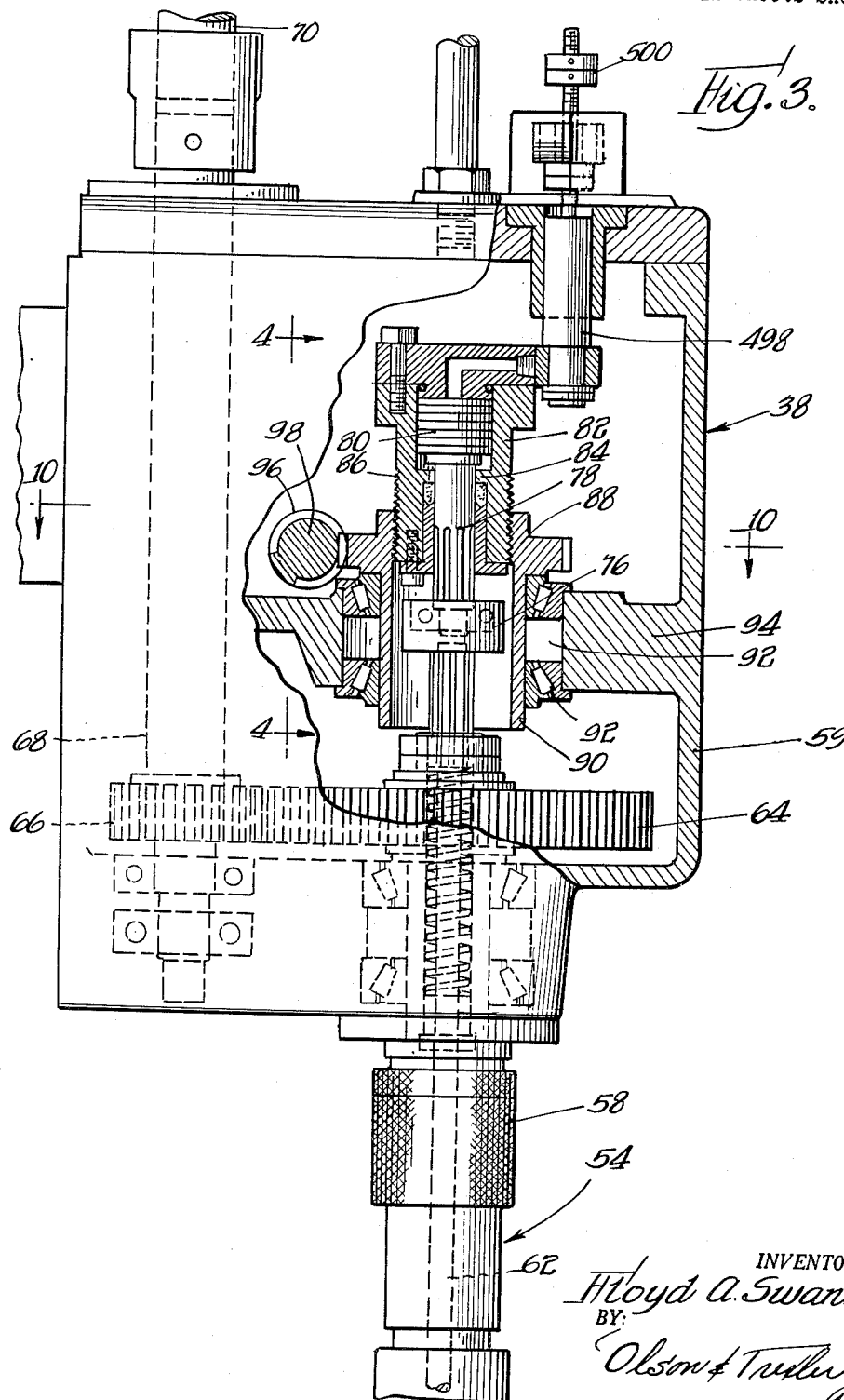

INVENTOR.
Floyd A. Swanson
BY
Olson & Trexler
Attys.

March 20, 1962 F. A. SWANSON 3,025,642
HONING APPARATUS
Filed June 6, 1958 12 Sheets-Sheet 4
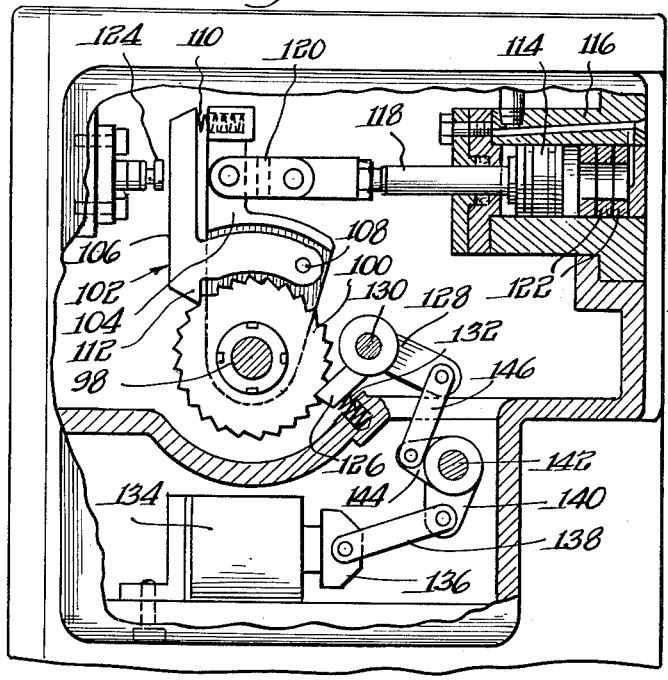
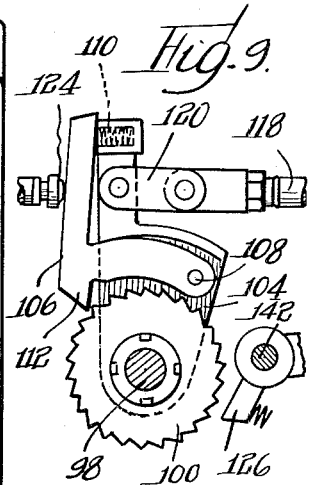
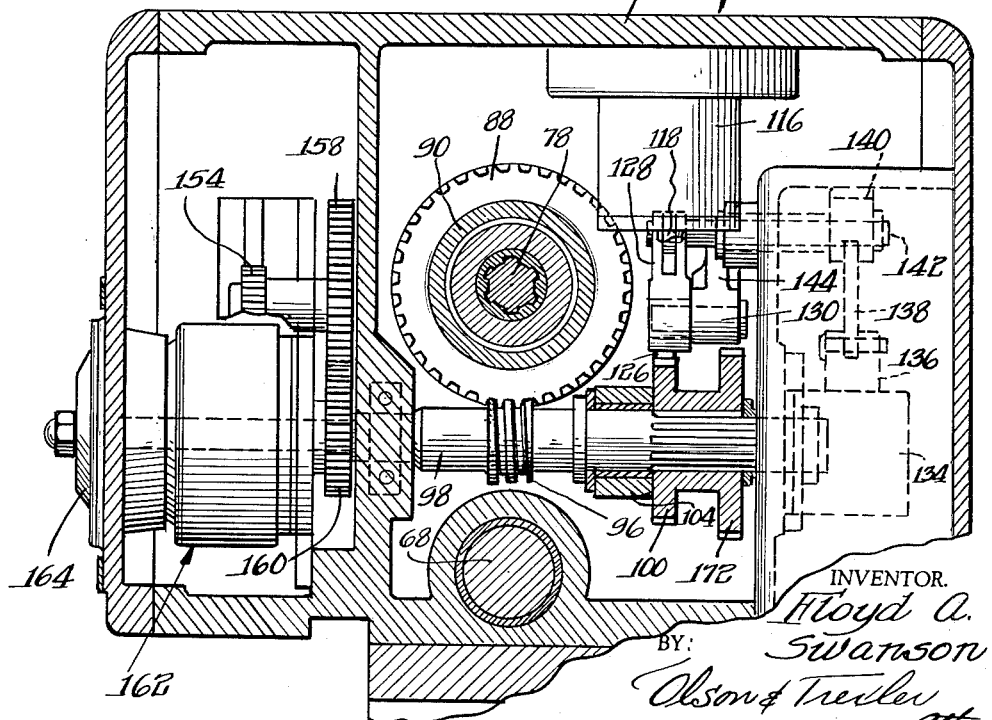
INVENTOR.
Floyd A. Swanson
BY: Olson & Trexler
attys

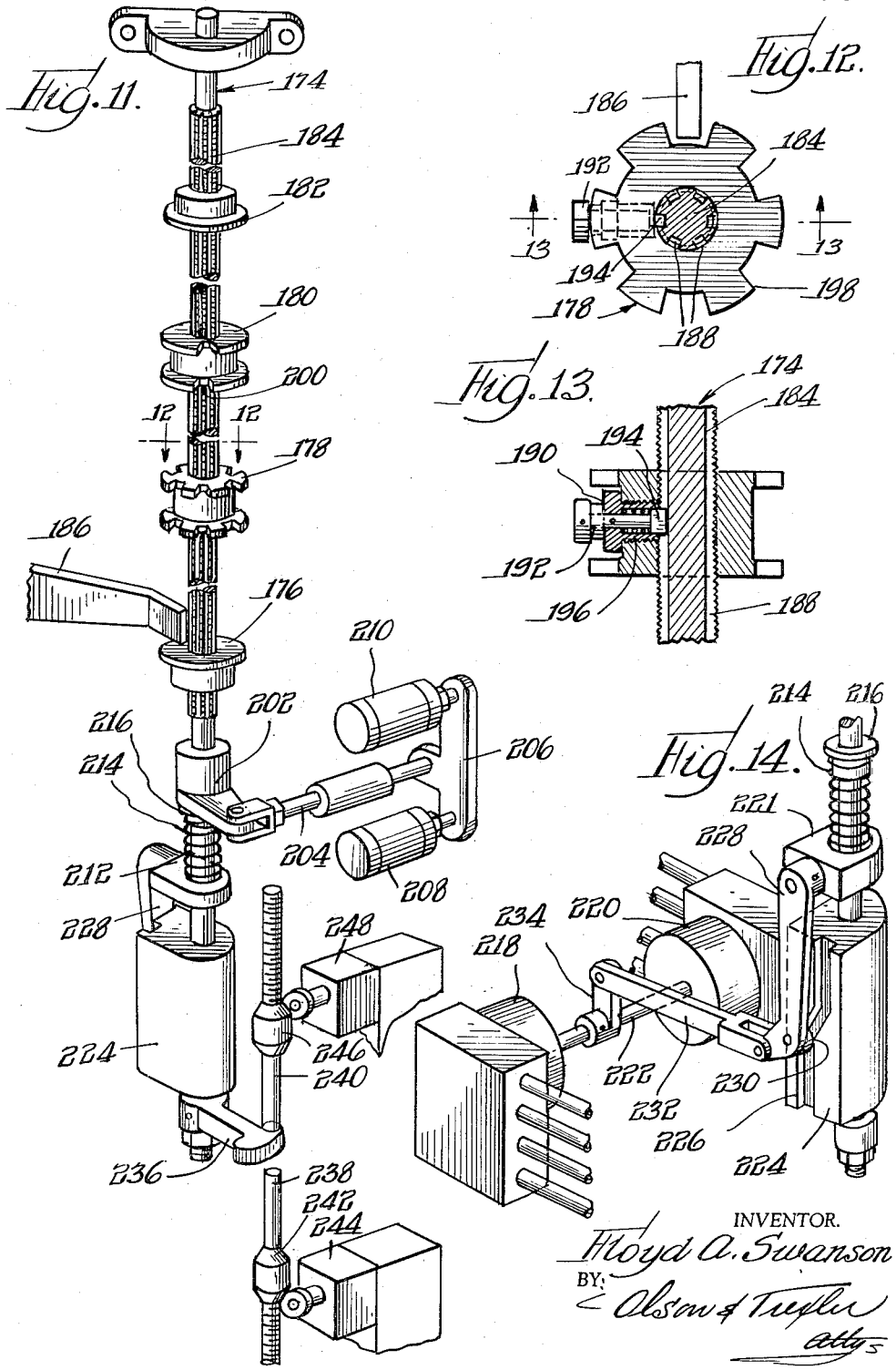

INVENTOR.
Floyd A. Swanson
BY
Olson & Trexler
attys

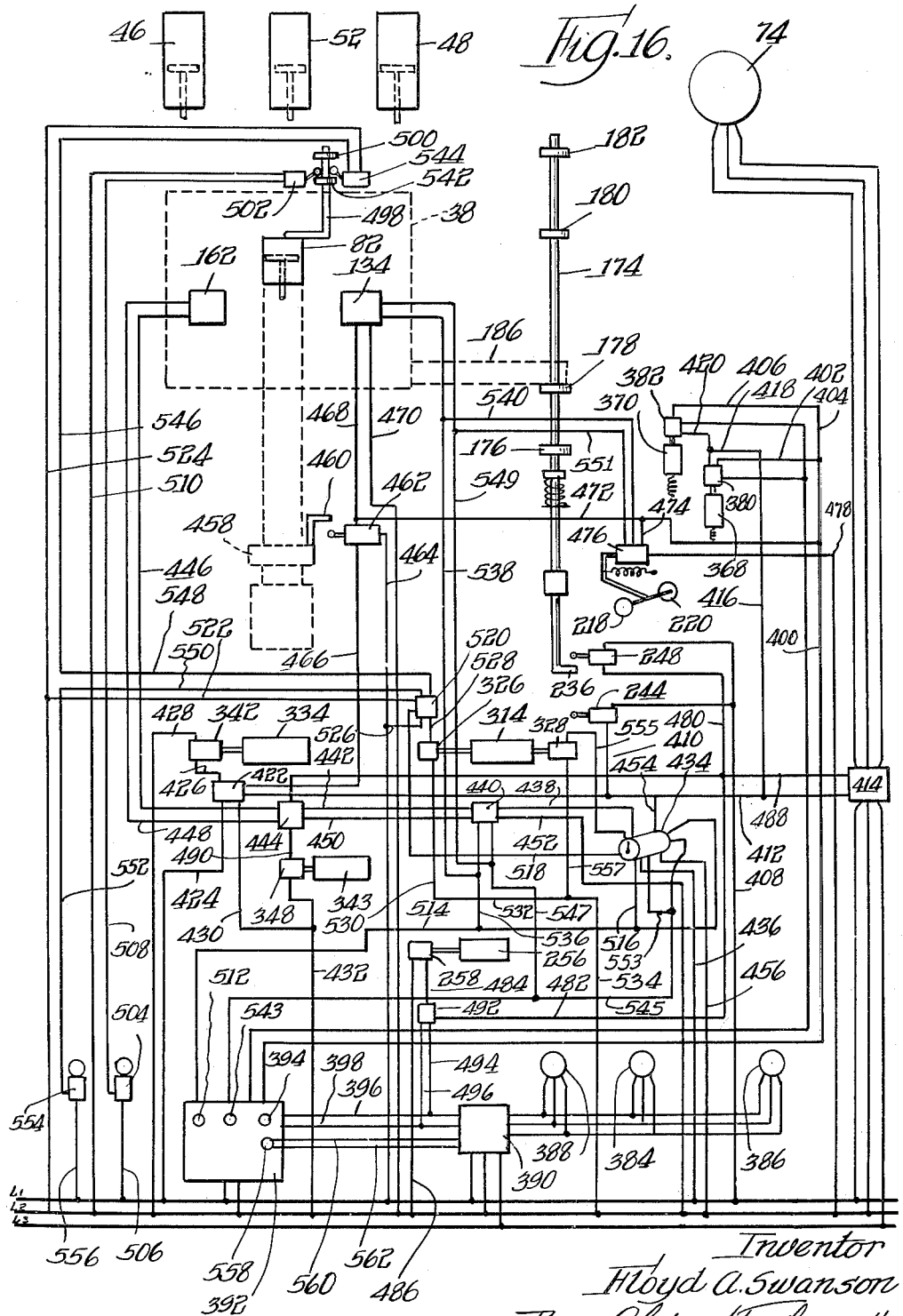

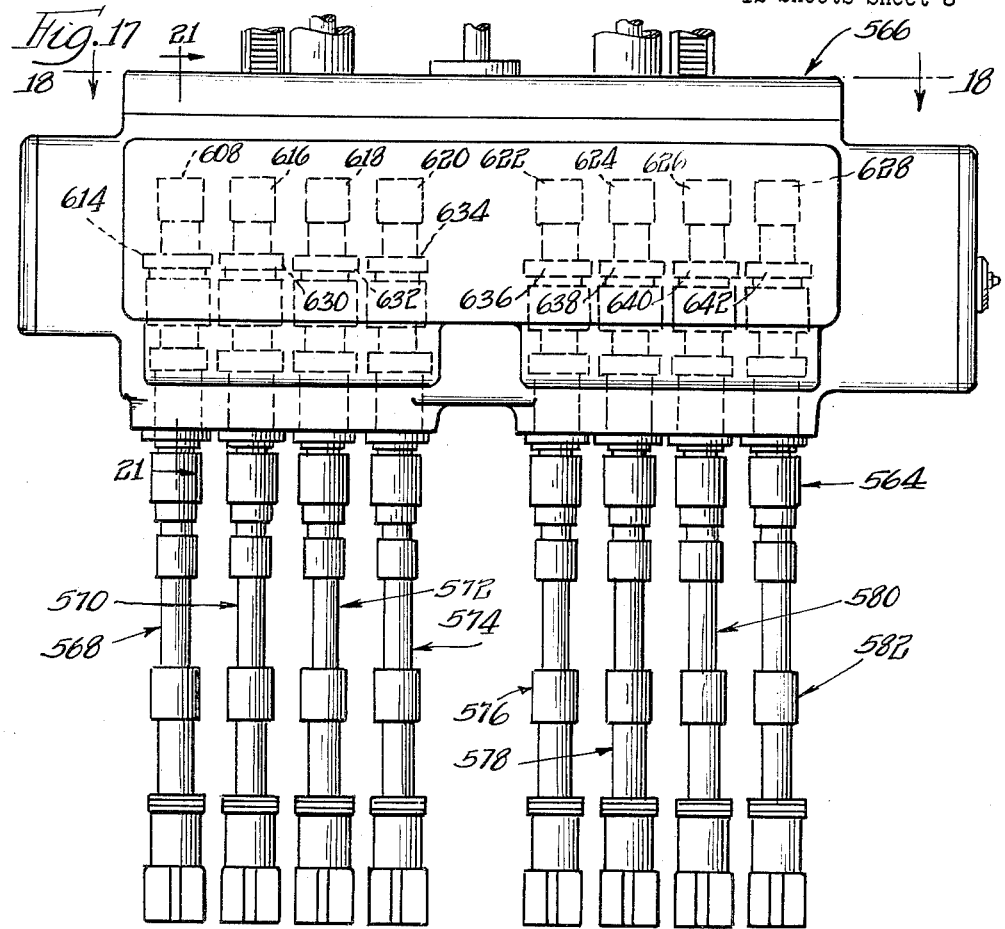
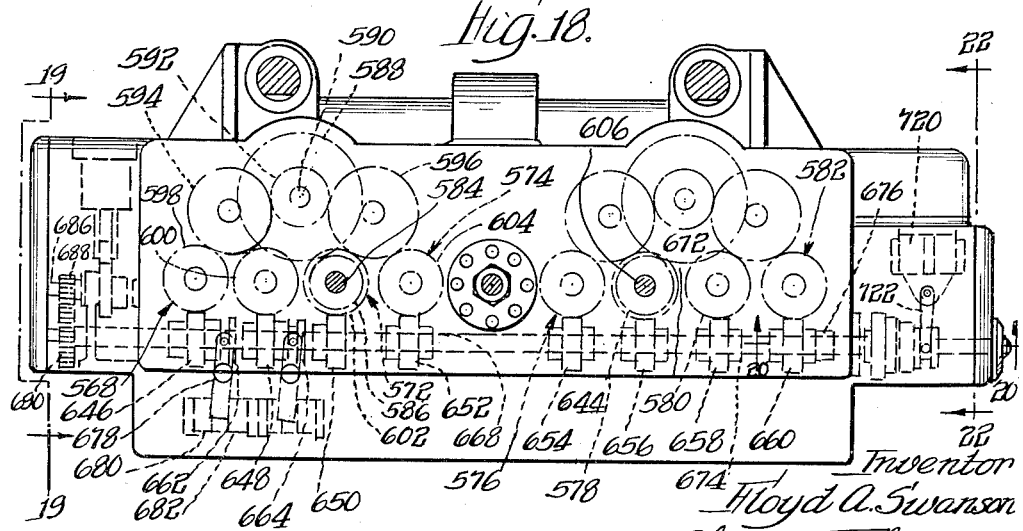

March 20, 1962  F. A. SWANSON  3,025,642
HONING APPARATUS

Filed June 6, 1958  12 Sheets-Sheet 9

INVENTOR.
Floyd A. Swanson
BY Olson & Trexler
attys.

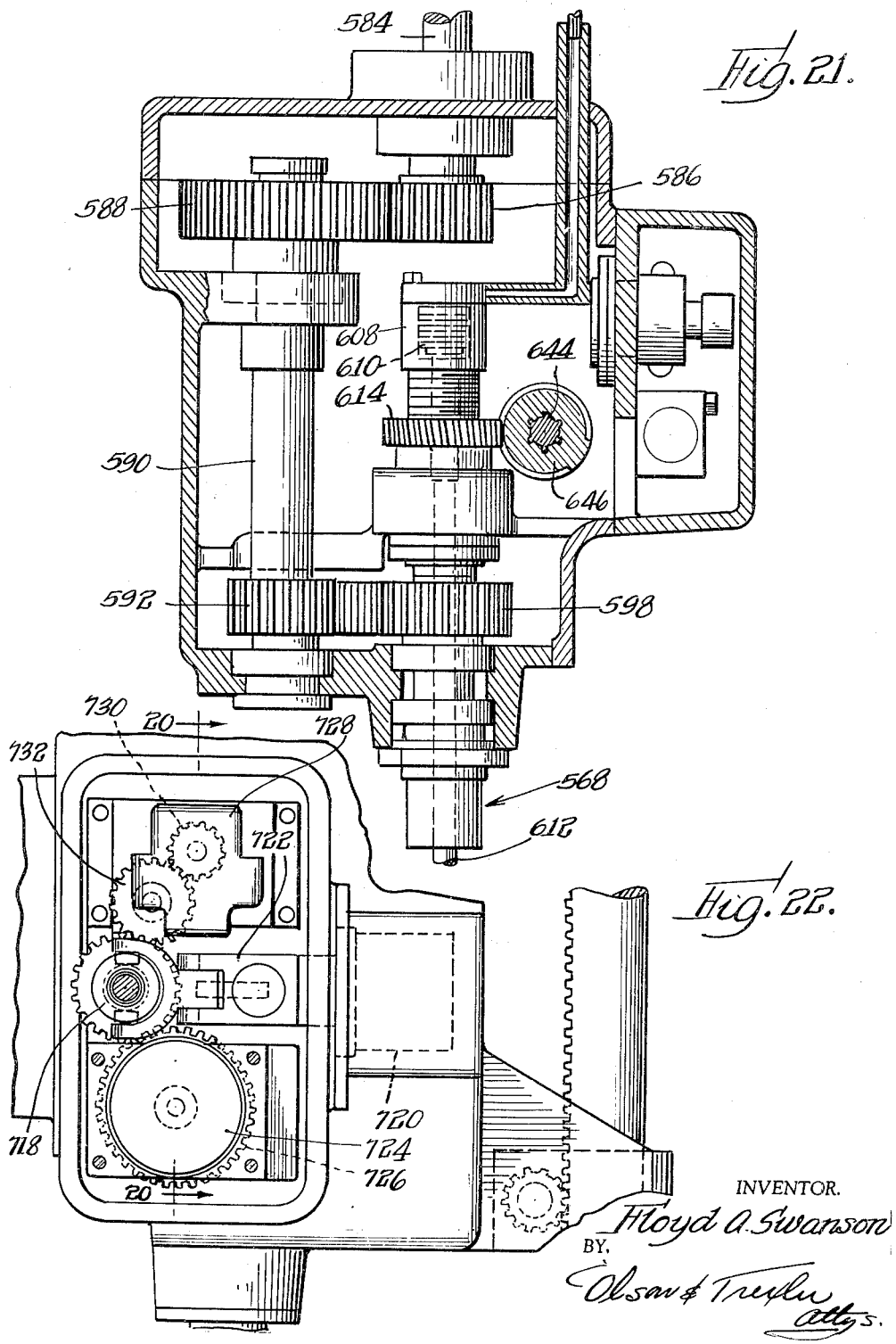

March 20, 1962   F. A. SWANSON   3,025,642
HONING APPARATUS
Filed June 6, 1958   12 Sheets-Sheet 11

INVENTOR.
Floyd A. Swanson
BY
Olson & Trexler
Attys.

March 20, 1962  F. A. SWANSON  3,025,642
HONING APPARATUS
Filed June 6, 1958  12 Sheets-Sheet 12

INVENTOR.
Floyd A. Swanson
BY
Olson & Trexler
Attys.

United States Patent Office 3,025,642
Patented Mar. 20, 1962

3,025,642
HONING APPARATUS
Floyd A. Swanson, Rockford, Ill., assignor, by mesne assignments, to National Automatic Tool Company, Inc., Richmond, Ind., a corporation of Indiana
Filed June 6, 1958, Ser. No. 740,445
11 Claims. (Cl. 51—34)

The present application relates to a novel honing apparatus and, more particularly, to a novel apparatus of the type wherein an expansion type honing tool is reciprocated, rotated and expanded within a workpiece bore.

As will be understood, the honing tool in an apparatus of the type contemplated herein comprises an expandable head having a plurality of replaceable stones on a hollow spindle, and axially shiftable rod means extending through the spindle for radially expanding the stones through suitable cam means. Heretofore, the honing stones have been inserted into the bore in a workpiece such as an internal combustion engine block while in a collapsed condition whereupon the actuating rod has been hydraulically shifted so as to expand the stones into engagement with the workpiece. As the honing operation progresses, the diameter of the bore increases so that the stones must be further fed or expanded, and it has heretofore been proposed to accomplish this feeding of the stones by a hydraulic cylinder connected to the actuating rod or by a wedge or cam member operatively associated with the rod and actuated by another hydraulic cylinder which is supplied with fluid from a metering pump. With such heretofore proposed apparatus, the feeding movement or expansion of the honing stones is limited only by engagement of the stones with the wall of the workpiece bore. As will be understood, this is not always satisfactory since, for example, the bore walls of workpieces such as engine blocks frequently vary in thickness so that when the honing stones are fed or expanded against the bore wall with great force supplied by the hydraulic cylinders, the wall may be distorted with the result that the finished bore may be sufficiently out of round to require discarding of the workpiece. The above mentioned hydraulically operated wedge or cam member was proposed in an effort to obtain improved control over the feeding of the honing stones, but this suggestion in the light of the present invention is inadequate primarily as a result of the lack of positive control of the feed movement of the stones and as a result of the difficulty in accurately metering the small volume of hydraulic fluid required for the feeding movement.

An important object of the present invention is to provide a novel honing apparatus or the like wherein the tools or honing stones are fed or expanded positively and accurately in a predetermined manner so as to obtain substantially improved accuracy in the finished surface of the workpiece.

A further object of the present invention is to provide a novel honing apparatus or the like which is constructed so that the workpiece finishing or honing operation may be accomplished substantially more rapidly than with heretofore proposed machines and so that the wear rate of the honing stones is materially reduced whereby workpieces may be finished more economically.

A more specific object of the present invention is to provide an apparatus of the above described type with novel means for collapsing or retracting the tools or honing stones at the end of a honing operation in a manner which allows for wear of the honing stones so that the stones may be brought more rapidly into engagement with another workpiece at the start of a succeeding honing operation.

A further more specific object of the present invention is to provide a novel honing apparatus of the above described type which is constructed so that the amount of wear sustained by the honing stones may be readily observed without stopping the apparatus and also so that an indication is provided whenever the honing stones are worn sufficiently so that replacement is required.

Still another object of the present invention is to provide a novel apparatus which is constructed so that the honing stones may be rapidly expanded or contracted so as to reduce the time required for setting up the apparatus or for replacing the stones when they are worn.

Another specific object of the present invention is to provide a novel control assembly including a shaft and dogs thereon especially useful in an apparatus of the above described type, which assembly is constructed so that the dogs may be easily and accurately adjusted in small increments along the shaft and positively locked in the desired adjusted position.

Other objects and advantages of the present invention will become apparent from the following description and the accompanying drawings wherein:

FIG. 1 is a fragmentary side elevational view showing an apparatus incorporating the features of the present invention;

FIG. 2 is a fragmentary front elevational view of the novel apparatus;

FIG. 3 is an enlarged view of a reciprocable head of the apparatus partially in cross section generally along the line 3—3 in FIG. 2;

FIG. 8 is a fragmentary sectional view taken generally along line 8—8 in FIG. 4;

FIG. 9 is a fragmentary sectional view of a portion of a ratchet mechanism in the reciprocable head, which view is similar to FIG. 8 but shows, in part, the manner in which the mechanism is actuated;

FIG. 10 is a fragmentary sectional view taken along line 10—10 in FIG. 3;

FIG. 11 is a perspective view showing a novel control rod and dog assembly and other control elements associated therewith;

FIG. 12 is a fragmentary sectional view taken along line 12—12 in FIG. 11;

FIG. 13 is a sectional view taken along line 13—13 in FIG. 12;

FIG. 14 is a fragmentary perspective view of a lower portion of the assembly shown in FIG. 11 and further shows the manner in which a pair of pilot valves are actuated by the control rod and a fixed cam;

FIG. 16 is a simplified diagrammatic view of a portion of the electrical circuit of the apparatus;

FIG. 17 is a fragmentary front elevational view showing a modified form of the present invention which includes a plurality of spindles or honing tools;

FIG. 18 is a sectional view taken along line 18—18 in FIG. 17;

FIG. 21 is an enlarged fragmentary sectional view taken along line 21—21 in FIG. 17;

FIG. 22 is an enlarged fragmentary sectional view taken along line 22—22 in FIG. 18;

Figure 4:
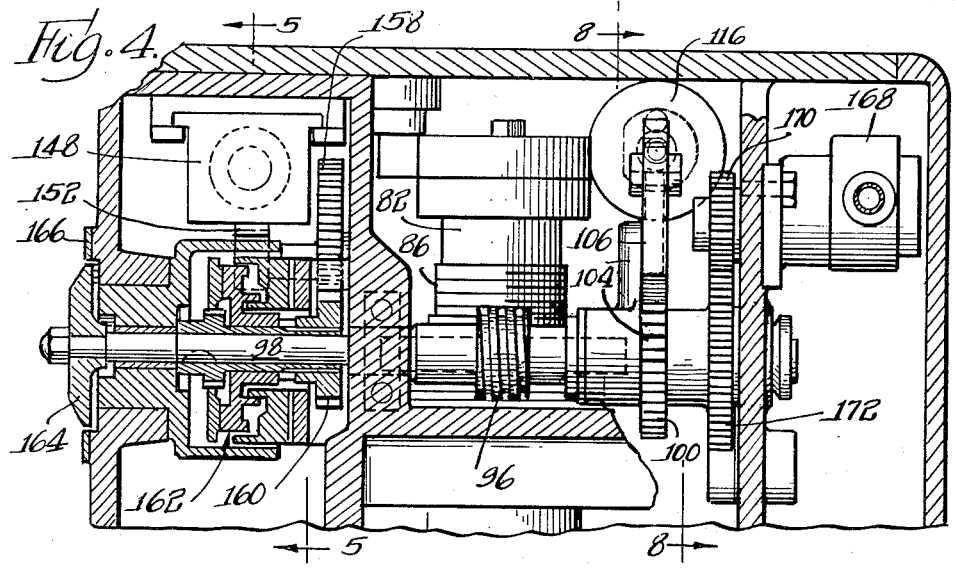
FIG. 4 is a fragmentary sectional view taken generally along the line 4—4 in FIG. 3.

Referring now more specifically to the drawings wherein like parts are designated by the same numerals throughout the various figures, an apparatus 30 incorporating features of the present invention is shown in FIGS. 1 and 2. In general, the apparatus 30 comprises an upstanding frame 32 having a fixture 34 mounted on the base portion thereof for supporting a workpiece 36 such as an engine block. A reciprocable head 38 is mounted on vertical ways 40 secured to the frame, which head is connected to lower ends of piston rods 42 and 44 associated with hydraulic cylinders 46 and 48 mounted on the upper end of the frame and actuated in the manner described below for vertically reciprocating the head. The head is also connected to the lower end of a piston rod 50 associated with a pneumatic balancing cylinder 52 mounted between the hydraulic cylinders. A honing tool 54 depends from the head 38 for passing through a tool guide 56 secured to the machine frame and entering the workpiece. The honing tool may be of known commercially available construction so that it need not be described in detail, and it suffices to state that the honing tool includes a hollow spindle 58 having its upper end rotatably supported in the frame 59 of the head 38, and expandable honing stone assembly 60 at the lower end of the spindle, and an axially shiftable rod 62 extending in the spindle for expanding the stones through suitable cone or cam means, not shown, when the rod is shifted downwardly and for permitting the stones to be retracted when the rod is shifted upwardly. In order to rotate the honing tool, a gear 64, see FIG. 3, is secured to the upper end of the spindle, which gear meshes with a pinion 66 mounted on a shaft 68 journalled in the head frame 59. The shaft 68 is coupled with a splined drive shaft 70 which is vertically slidably associated with a transmission 72 which is driven by a motor 74 and, in turn, drives the shaft 70. As will be understood, the actuating rod 62 is shifted to or maintained in a raised or retracted position prior to the start of a honing operation so that the honing stones will be collapsed sufficiently to permit them to be inserted into the bore of a workpiece. Then after the stones have been inserted into the workpiece, the rod 62 is shifted downwardly to expand the stones for engagement with the hydraulic cylinders. A honing tool 54 depends from the head 38 for passing through a tool guide 56 secured to the machine frame and entering the workpiece. The honing tool may be of known commercially available construction so that it need not be described in detail, and it suffices to state that the honing tool includes a hollow spindle 58 having its upper end rotatably supported in the frame 59 of the head 38, and expandable honing stone assembly 60 at the lower end of the spindle, and an axially shiftable rod 62 extending in the spindle for expanding the stones through suitable cone or cam means, not shown, when the rod is shifted downwardly and for permitting the stones to be retracted when the rod is shifted upwardly. In order to rotate the honing tool, a gear 64, see FIG. 3, is secured to the upper end of the spindle, which gear meshes with a pinion 66 mounted on a shaft 68 journalled in the head frame 59. The shaft 68 is coupled with a splined drive shaft 70 which is vertically slidably associated with a transmission 72 which is driven by a motor 74 and, in turn, drives the shaft 70. As will be understood, the actuating rod 62 is shifted to or maintained in a raised or retracted position prior to the start of a honing operation so that the honing stones will be collapsed sufficiently to permit them to be inserted into the bore of a workpiece. Then after the stones have been inserted into the workpiece, the rod 62 is shifted downwardly to expand the stones for engagement with the workpiece and subsequently fed downwardly to feed or further expand the cylinder during the honing operation. In accordance with an important feature of the present invention, the rod 62 is positively and accurately shifted or fed by the means in the head assembly 38 shown in detail in FIGS. 3–5 and 8–10. More specifically, the upper end of the rod 62 which rotates with the spindle 58 is connected by means of a rotary coupling 76 to the lower end of a piston rod 78 secured to a piston 80 reciprocably disposed in a hydraulic cylinder 82. In the position shown in FIG. 3, the piston 80 is fully raised so that the rod 62 is retracted to permit collapsing of the honing stones for disengagement from the work. Initial rapid expansion of the stones is accomplished by hydraulically shifting the piston 80 downwardly until it engages an internal shoulder or stop 84 of the cylinder 82. It is important to note that the stop 84 is located so that the piston 80 can expand the stones only sufficiently to position them for engagement with the work upon subsequent feeding or expansion thereof in the manner described below, or, at most, only into relatively light engagement with the work so that the hydraulic pressure in the upper end of the cylinder 82 cannot force the stones against the work in a manner which will cause distortion of the work. It is also important to note, however, that the hydraulic pressure in the upper end of the cylinder 82 which will maintain the piston against the stop 84 is controlled and can be relieved in the manner described below so that in the event the pressure of the stones against the work becomes excessive as they are fed or expanded, the piston 80 will arise from the stop 84 to permit retraction of the rod 62 and collapsing of the honing stones sufficiently to relieve the excess honing pressure.

The hydraulic cylinder 82 is provided with external helical thread convolutions 86 and is turned into an internally threaded worm wheel 88 having a hollow sleeve section 90 journalled in bearings 92 mounted in a web 94 of the head frame 59. It is to be noted that upon turning of the worm wheel 88 which is retained against vertical displacement relative to the head frame, the hydraulic cylinder 82 will be raised or lowered. When the piston 80 is abutting the stop 84, the piston 80 and the cylinder will move together as a unit so that downward movement of the rod 62 and expansion or feeding movement of the honing stones is accomplished by rotating the worm wheel 88 so as to lower the cylinder 82.

It is also important to note that in accordance with the present invention the mechanism is constructed so that the honing stones are fed or expanded intermittently and by predetermined increments so as subtantially to eliminate the possibility of overfeeding of the stones. This is accomplished by rotating the worm wheel intermittently and in predetermined increments. More specifically, a worm 96 on shaft 98 meshes with the worm wheel 88. A ratchet wheel 100 is drivingly connected with the shaft 98. Pawl means 102 shown best in FIGS. 8 and 9 is provided for driving the ratchet wheel. The pawl means comprises a lever 104 freely pivotally mounted about the shaft 98 and a generally L-shaped pawl member 106 pivoted to the lever 104 at 108. A spring 110 is provided between upper ends of the lever and pawl member so as to bias the pawl member 106 in a counterclockwise direction about the pivot 108 as viewed in FIGS. 8 and 9 for normally urging the tip 112 of the pawl member into engagement with the ratchet wheel.

A piston 114 slidably disposed in a hydraulic cylinder 116 is provided for actuating the pawl means, which piston carries a rod 118 connected to the lever 104 by link means 120. When the piston 114 is moved toward the right as viewed in FIGS. 8 and 9, the pawl means functions to drive the ratchet wheel 100 to feed or expand the honing stones. The increment of feed or expansion of the honing stones is ultimately determined by the length of the stroke of the piston 114 so that the increment of feed may be adjusted by placing one or more stop rings or shims 122 in the cylinder 116 so as to adjust the length of the piston stroke. Preferably, the increment of feeding movement of the honing stones is adjusted so as to be substantially equal to the combined thickness of the material removed from the workpiece and the material worn from the honing stones between each feeding stroke of the piston 114. It is to be noted that when the piston 114 is shifted fully toward the left as viewed in FIGS. 8 and 9, an upper end portion of the pawl member 106 engages an abutment 124. This causes the pawl member to pivot in a clockwise direction about the point 108 as shown in FIG. 9 so that the tip 112 is disengaged from the ratchet wheel 100 to permit reverse rotation of the shaft 98 and resetting of the honing stones when, for example, a first honing operation has been completed and the stones must be contracted and reset for entry into a second workpiece.

A locking dog 126 connected with a lever 128 which is pivotally mounted on a pin 130 is resiliently urged by a spring 132 into engagement with the ratchet wheel 100 so as to preclude unauthorized retrograde rotation of the ratchet wheel between feeding strokes of the piston 114. An electrical solenoid 134 is provided for retracting the dog 126 to the position shown in FIG. 9 for permitting authorized retrograde movement of the ratchet wheel and resetting of the honing stones. The plunger 136 of the solenoid is connected by a link 138 with a lever 140 mounted on a shaft 142 and integral with or connected to a lever 144 which is connected by link 146 to the dog lever 128.

Figure 5:
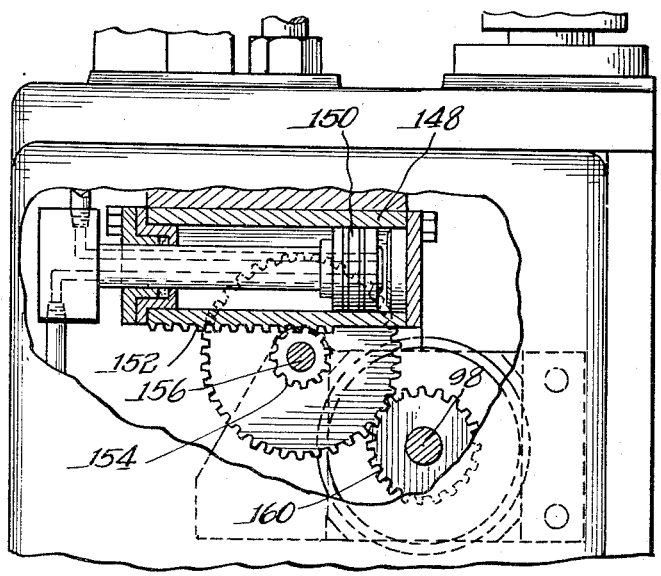
FIG. 5 is a fragmentary sectional view taken along the line 5—5 in FIG. 4.
Figure 7:
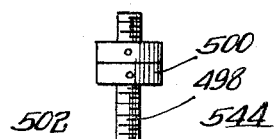
FIG. 7 is a fragmentary side elevational view of the assembly shown in FIG. 6.
Figure 6:
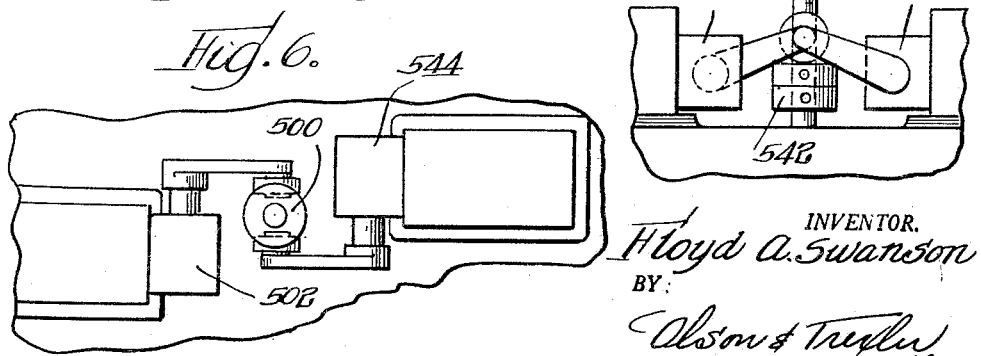
FIG. 6 is a fragmentary plan view of a limit switch assembly mounted on top of the reciprocable head.

In order to reverse the shaft 98 and thus raise the cylinder 82 toward its original position with respect to the worm wheel 88 for collapsing and resetting the honing stones at the end of a honing operation, the means shown in FIGS. 4, 5 and 10 is provided. More specifically, a hydraulic cylinder 148 is associated with a piston 150 which is fixed with respect to the head frame 59 so that the cylinder 148 rather than the piston is reciprocable. A rack 152 is carried by the cylinder 148 and meshes with a pinion 154 on a shaft 156, which shaft also has fixed thereto a gear 158. The gear 158 meshes with a pinion 160 which is rotatably mounted on the shaft 98 but which is connected with an electrical clutch 162 on the shaft 98. The electrical clutch is of known commercially available construction and, therefore, need not be described in detail, and it suffices to state that when the clutch is energized, a driving connection is provided between the pinion 160 and the shaft 98 and when the clutch is deenergized, the shaft 98 will rotate freely relative to the pinion 160. During feeding movement of the shaft 98 in a clockwise direction as viewed in FIG. 5, hydraulic pressure within the cylinder 148 is relieved so that when the clutch 162 is energized the cylinder 148 will be driven from the shaft 98 through the gears and rack toward the left as viewed in FIG. 5. When it is desired to reset the honing stones, the pawl 106 and dog 126 are retracted from the ratchet wheel and hydraulic fluid under pressure is admitted to the cylinder 148 at the full end of the piston so that the cylinder is shifted toward the right as viewed in FIG. 5 and the shaft 98 is reversely driven through the rack and gear means. Thus, the honing stones will be contracted in accordance with the length of the stroke of the cylinder 148.

It will be appreciated that during a honing operation, the honing stones will become worn so that if, during resetting for a subsequent honing operation, the stones are fully collapsed to their original positions, considerable time would be wasted during the next honing operation. This is a result of the fact that the stones can be expanded only a predetermined fixed amount by the piston 80 so that worn stones would have to be fed at a relatively slow rate by the ratchet mechanism for a considerable distance before they could engage the workpiece. Of course, this problem would become increasingly aggravated after each successive honing operation. However, with the mechanism of this invention, the electric clutch 162 is de-energized for a predetermined time interval at the start of each honing operation so that the cylinder 148 will not be shifted during this time interval whereby the length of the cylinder stroke is adjusted to allow for wear of the honing stones. In other words, by de-energizing the electric clutch 162 for a predetermined time interval the length of the cylinder 148 stroke can be adjusted so that the cylinder will reversely drive the worm wheel 88 a predetermined amount less than the worm wheel was rotated to feed the honing stones during a honing operation whereby the honing stones will be reset or collapsed only sufficiently to position their worn work engaging surfaces in a circle having a diameter substantially equal to the diameter of a circle defined by these stone surfaces before they became worn and when the stones were fully collapsed.

It is to be noted that during a honing operation, the angular displacement of the shaft 98 from its position at the start of a honing operation provides an indication of the amount which the honing stones have been fed or expanded and, therefore, the progress of the honing operation. In order to make this indication readily available to an operator, a calibrated dial 164 is secured to the outer end of the shaft 98 and a cooperating reference arrow or mark 166 is provided on the head frame 59. The dial 164 may be calibrated in any desired manner and, for example, each increment on the dial could be made to correspond to 0.0001 of an inch of feeding movement of the honing stones. Furthermore, the displacement of the dial with respect to the reference mark 166 when the shaft 98 has been reversely rotated to reset the honing stones after a honing operation will provide an indicating of the amount which the stones have been worn.

It will be appreciated that after a considerable number of honing operations and the stones have become substantially worn out, the hydraulic cylinder 82 will be turned into the worm wheel 88 considerably from its original position. Thus, when the stones are to be replaced, it is necessary to rotate the worm wheel 88 so as to raise substantially fully the cylinder 82. In order to accomplish this, a reversible hydraulic motor 168 (see FIG. 4) is provided having a pinion 170 on its drive shaft which meshes with a gear 172 connected with the worm shaft 98. With this arrangement, the worm wheel may be driven to raise the hydraulic cylinder 82 rapidly to permit replacement of the honing stones. The hydraulic motor may also be used for lowering the hydraulic cylinder 82 during initial setup of the apparatus after the replacement of the stones so that this operation is facilitated and setup time is reduced.

In FIGS. 1 and 11–14 a portion of the apparatus control means is shown. This means includes a control rod 174 which is slidably mounted for vertical reciprocable movement in the main apparatus frame 32. Control dogs 176, 178, 180 and 182 are adjustably mounted on a section 184 of the rod 174, which dogs are adapted to be selectively engaged by a finger 186 extending from the head 38. It is important to note that the rod section 184 is provided with external helical threads and the dogs 176 through 182 are internally threaded so that the dogs may be accurately axially adjusted by turning them relative to the rod. In order securely to lock the dogs in the desired adjusted positions, the rod section 184 is provided with a plurality of circumferentially spaced longitudinally extending splines 188, and each of the dogs is provided with a spring biased locking member or wedge adapted selectively to enter the rod splines. More specifically, the dog 178 which is shown in detail in FIGS. 12 and 13 is provided with a transverse aperture into which a fitting 190 is threaded. A plunger 192 slidably extends through the fitting and is provided with a wedging block 194 at its inner end adapted to enter the rod splines. A spring 196 encircles the plunger within the fitting for yieldably maintaining the block 194 within the desired spline. With this structure it will be apparent that the dog 178 may be readily adjusted along the rod merely by retracting the plunger 192 and rotating the dog the desired amount necessary for permitting the block 194 to enter a selected spline. The remaining dogs are provided with substantially identical spring biased plungers which need not be shown or described in detail. Extremely fine and accurate adjustments of the dogs may be made in increments equal to the axial displacement of the helical thread segments on the rod between the splines 183. The control rod 174 is adapted to be turned about its longitudinal axis in the manner described below to selected positions, and the dogs 178 and 180 are provided with notches 198 and 200 through which the finger 186 may pass when the rod is in certain of the selected positions for the purposes set forth below. In order to turn the rod 174 for positioning the dogs 178 and 180 either for engagement with the finger 186 or for permitting the finger to pass therethrough, a lever 202 is secured to the rod and is connected by a link assembly 204 to a yoke 206. Piston rods of pneumatic cylinders 208 and 210 are connected to the yoke 206. The cylinders 208 and 210 are adapted to be operated as will be described below selectively to locate the rod at a middle position shown in FIG. 11 in which the finger 186 may pass through a slot in the dog 178, or in an operating position turned clockwise from the middle position as viewed from the upper end of the rod, in which operating position the finger 186 will engage the dog 178, and in a third position offset 30° in a counterclockwise direction from the middle position in which the finger 186 may pass through a slot in the dog 180.

An apertured member 212 which is fixed with respect to the main frame of the apparatus slidably receives the control rod below the arm 202. As will presently become more apparent, the control rod is shifted up and down during operation of the apparatus and means is provided for normally maintaining the rod in the vertical position to which it has been shifted until the finger 186 engages one of the dogs on the rod and again shifts the rod. In the present embodiment this means is in the form of a spring 214 supported on the member 212 and engaging a collar 216 secured to the rod. The spring 214 is a substantially constant force type spring and is formed so as substantially to counterbalance the weight of the rod 174 and the various elements thereon.

Referring particularly to FIGS. 11 and 14, a pair of pilot valves 218 and 220 is provided adjacent the control rod, which valves control, in the manner described below, the operation of the hydraulic cylinders 46 and 48 and 116 and thus the vertical reciprocating movement of the head 38 and also the operation of the ratchet mechanism in the head 38. A shaft 222 common to the pilot valves 218 and 220 is oscillated in response to reciprocable movement of the rod 174. This is accomplished by mounting a block 224 having a cam slot 226 therein on the control rod for vertical movement with the rod without rotation with the rod. A lever 228 is pivoted to the fixed member 212 and carries a roller 230 which projects into the cam slot. A link 232 is connected between an end of the lever 228 and another lever 234 secured to the shaft 222 of the pilot valves.

A finger 236 is secured to the lower end of the rod 174, which finger is adapted to project between lower and upper vertically shiftable spring biased rods 238 and 240 when the control rod 174 is in the middle position mentioned above. The rod 238 carries a dog 242 for actuating a limit switch 244 when the rod 238 is depressed by the finger 236 upon downward movement of the control rod 174. Similarly, the rod 240 carries a dog 246 for actuating a switch 248 when it is lifted by the finger 236 upon upward movement of the control rod.

Figure 15:
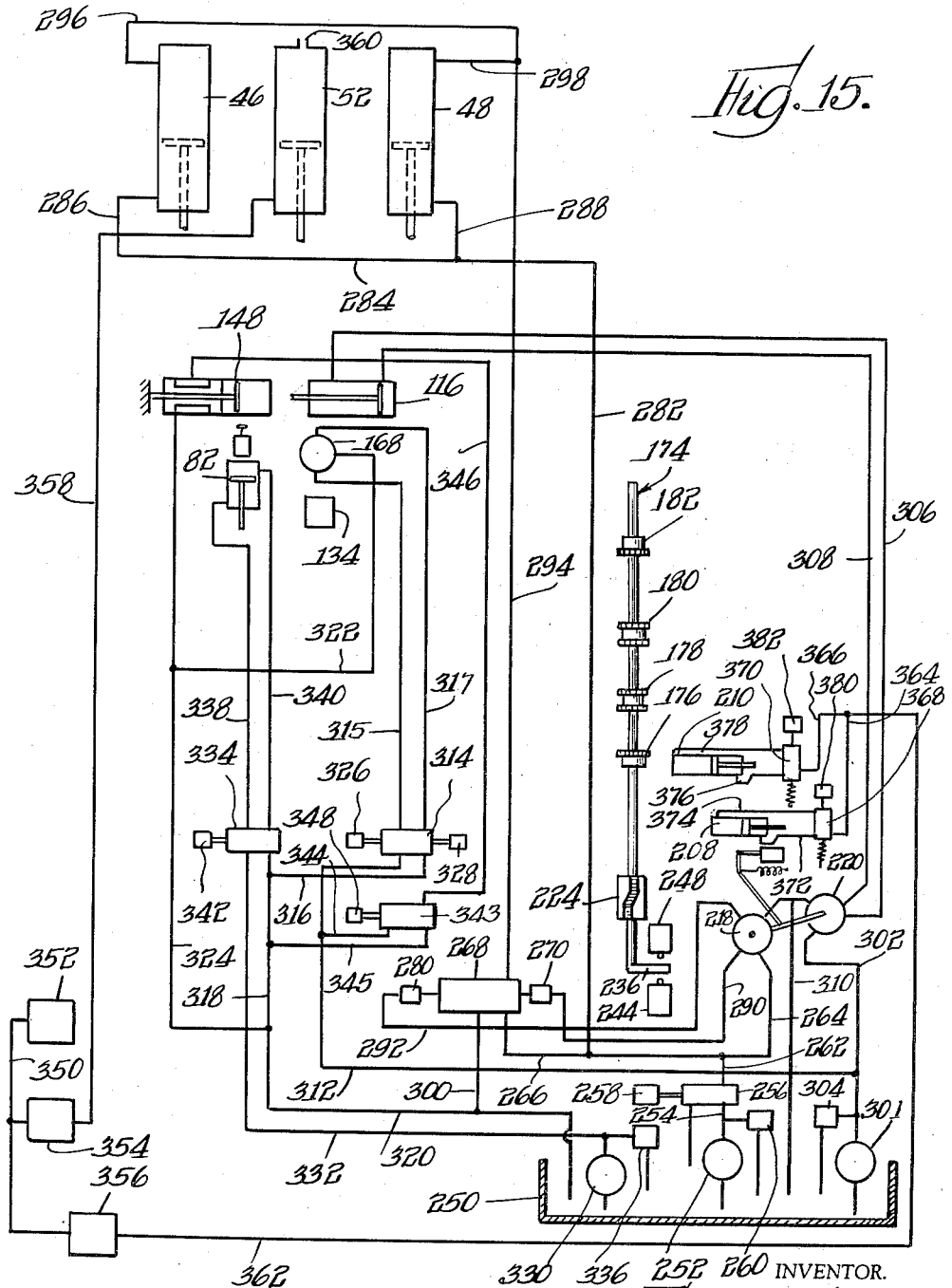
FIG. 15 is a simplified diagrammatic view of a hydraulic and pneumatic circuit of the apparatus.

In FIG. 15 there is shown in simplified and diagrammatic form the hydraulic and pneumatic system for the apparatus. This system includes a conveniently located hydraulic reservoir 250 to which an inlet of a motor driven pump 252 is connected. An outlet 254 of the pump is connected with a normally closed dump valve 256 adapted to be operated by a solenoid 258, and a pressure relief valve 260 is also connected with the pump outlet line 254. A line 262 from the dump valve is respectively connected by branch lines 264 and 266 to inlet ports of the pilot valve 218 and a valve 268 which is adapted selectively to be positioned by a pilot piston means 270 and 280. The branch power line 266 is also continuously connected with the rod ends of the cylinders 46 and 48 by lines 282, 284, 286 and 288. One outlet of the pilot valve 218 is connected with the pilot means 270 by a line 290 and the other outlet of the pilot valve is connected with the pilot means 280 by a line 292. The outlet of the valve 268 is connected to the head end of the hydraulic cylinders 46 and 48 by conduits 294, 296 and 298. When the pilot valve 218 is oscillated in the manner described above, the outlet line 294 of the valve 268 is alternately connected with the power line 266 and with a drain line 300 so that the pressure in the head end of the cylinders 46 and 48 is alternately increased and relieved. It will be appreciated that the effective piston area at the rod end of the cylinders 46 and 48 is less than at the head end so that when the pressure is applied to the head end of the cylinders, their pistons will be extended and the honing head 38 will be lowered, and when the pressure in the head end of the cylinders is relieved, the honing head will be raised.

A second motor driven pump 301 is connected with the reservoir and has an outlet line 302 connected with a port of the pilot valve 220. Another pressure relief valve 304 is also connected with the power line 302. Additional ports of the valve 220 are respectively connected by lines 306 and 308 with the rod and head ends of the ratcheting cylinder 116. A drain port of the valve 220 is connected with a drain line 310 which is also connected to the drain port of the pilot valve 218. Since the valves 218 and 220 are oscillated together, it will be noted that the ratcheting cylinder 116 is operated in unison with the head reciprocating cylinders 46 and 48. Preferably, the arrangement is such that the ratcheting cylinder 116 will be operated to feed or expand the honing stones only substantially at the lower end of the vertical reciprocating movement of the head 38 and thus, the honing tool. Thus, after each feeding step of the honing stone has been accomplished, the stones will move fully upwardly and substantially fully downwardly before further radial feeding movement or expansion is imparted thereto. This promotes uniform treatment of all portions of the workpiece bore.

The power line 302 of the pump 300 is also connected by a conduit 312 with an inlet port of a valve 314 associated with the fluid motor 168. Additional ports of the valve 314 are connected with inlet ports of the fluid motor 168 by lines 315 and 317, and an outlet of the valve 314 is connected with the reservoir by drain lines 316, 318 and 320. A drain port of the fluid motor 168 is connected by a drain line 322 which, in turn, is connected to the drain line 318 by a conduit 324. Electrical solenoids 326 and 328 are provided for selectively shifting the valve 314 for alternately connecting the lines 316 and 318 with the power line 312 so as to drive the fluid motor 168 in opposite directions.

Another motor driven pump 330 is connected with the hydraulic reservoir and has an outlet power line 332 connected with an inlet port of a valve 334 associated with the hydraulic cylinder 82. A pressure relief valve 336 is connected with the power line 332 so as to control the maximum pressure which can be supplied to the cylinder 82. Ports of the valve 334 are respectively connected with the rod and head ends of the cylinder 82 by lines 338 and 340, and a drain port of this valve is connected to the drain line 318. An electrical solenoid 342 is provided for controlling the valve 334 so as selectively to connect the lines 338 and 340 with the power and drain lines 332 and 318. It is to be noted that during a honing operation when the line 340 is connected to the power line 332 and the piston in the cylinder 82 is fully extended and abuts the stop 84, any undue pressure which may arise between the honing stones and the work will be transmitted to the fluid in the head end of the cylinder 82. However, upon any tendency of the pressure in the head end of the cylinder 82 to build up, the pressure relief valve 336 will function to dump additional hydraulic liquid back to the reservoir so that the piston in the cylinder 82 will rise and permit the honing stones to collapse sufficiently to eliminate the undue pressure between the honing stones and the work. In other words, the relief valve 336 controls the maximum pressure with which the honing stones can be forced against the work. This feature is important since it not only prevents distortion of the workpiece, but it has also been found that the elimination of undue honing pressures greatly extends the working life of the honing stones and enables the apparatus to be operated at higher speeds so that the honing time for a given honing operation may be substantially reduced. For example, it has been found that with the present apparatus substantially twice as many bores in workpieces such as engine blocks can be honed before replacement of the stones is required as was heretofore possible with prior apparatus. Furthermore, the present apparatus enables the honing operation to be accomplished substantially three times as fast as compared with apparatus heretofore in general use.

A valve 343 is provided for controlling operation of the reset cylinder 148, which valve has an inlet port connected to the power line 312 by a conduit 344 and a drain port connected to the drain line 318 by a conduit 345. A port of the valve 343 is connected to the rod end of the cylinder 148 by a line 346, and the head end of the cylinder 148 is continuously in communication with the drain line 324. A solenoid 348 is provided for controlling operation of the valve 343.

In the pneumatic portion of the system, a line 350 extends from a source 352 of air under pressure and is connected to pressure regulators 354 and 356. A line 358 extends from the pressure regulator 354 and is connected with the lower rod end of the pneumatic cylinder 52. The upper end of the cylinder is always opened to the atmosphere as at 360. The pressure regulator 354 is adjusted so that the lifting force provided by the piston within the cylinder 52 substantially balances the weight of the head 32 and the honing tool carried thereby so that the hydraulic cylinders 46 and 48 merely serves to reciprocate the head. A line 362 extends from the pressure regulator 356 and is connected by branch conduits 364 and 366 with valves 368 and 370 respectively associated with the pneumatic cylinders 208 and 210. Lines 372 and 374 respectively connect ports of the valve 368 with the rod and head ends of the cylinder 208, and lines 376 and 378 connect ports of the valve 370 with the rod and head ends respectively of the cylinder 210. Solenoids 380 and 382 are provided for actuating the valves 368 and 370 for controlling operation of the cylinders 208 and 210.

In FIG. 16 there is shown in simplified and diagrammatic form an electrical control circuit for the apparatus. Electric motors 384, 386 and 388 are respectively provided for the hydraulic pumps 252, 301 and 330, which motors are connectable through a relay 390 to main electrical power lines L-1, L-2 and L-3. A push-button switch box 392 is connected to the lines L-1 and L-2 and includes a push-button start switch 394 connected to the relay 390 by wires 396 and 398 for closing the relay and energizing the pump motors when the start button is pushed. Prior to the start of a honing operation, the head 38 is in a raised position so that the expandable honing stone assembly is retracted into the tool guide and the finger 186 is located above the dog 178 on the control 174. In addition, the pilot valve 218 is positioned so that when the motor 384 is energized to drive the pump 252, the cylinders 46 and 48 start moving the head 38 downwardly. In order to insure proper location of the control rod 174 for positioning the dog 178 to permit the finger 186 to pass through a slot therein during the initial downward movement of the head 38, the start switch 394 is also connected by wires 400—402 and 404—406 to the solenoids 380 and 382 respectively for energizing the solenoids to position their associated valves to admit air under pressure to the rod end of the cylinder 208 and the head end of the cylinder 210 so as to turn the control rod 174 counterclockwise to the desired position. As the head 38 approaches the lowermost point in its vertical reciprocable path of travel, the finger 186 engages the control rod dog 176 so that the control rod is shifted downwardly until the finger 236 thereon causes the switch 244 to be closed. This switch energizes a portion of the circuit to start and continue the honing operation until it is completed and stopped in the manner described below.

One lead of the switch 244 is connected with the line L-1 by a wire 408. Another lead of the switch 244 is connected by wires 410 and 412 to a relay 414 through which the motor 74 for driving the honing spindle is connectable to the lines L-1, L-2 and L-3. Upon closing of the switch 244, the relay 414 is closed to energize the motor 74. The wire 412 is also connected by wires 416, 418 and 420 to the solenoids 380 and 382 for energizing the solenoids for pressurizing the rod ends of both of the pneumatic cylinders 208 and 210 so as to cause the control rod 174 to be rotated in a clockwise direction to the operating position. In this operating position, the dog 178 is positioned for engagement with the finger 186. Thus, after the control rod has been lowered to close the switch 244 at which time the pilot valve 218 is shifted to start the upward stroke of the head 38 and honing tool, the dog 178 will be positioned to be engaged by the finger 186 as the head approaches the upper limit of its travel for raising the control rod 174 and again shifting the pilot valve 218 to reverse the head 38. It is clear that this up-and-down movement of the head 38 will continue as long as the dog 178 is positioned for engagement with the finger 186. Of course, the valve 220 is oscillated with the valve 218 to operate the ratchet and hone feeding mechanism.

The wire 412 is also connected with a relay 422 which is associated with the solenoid 342 of the valve 334. The relay 422 when closed is adapted to connect the solenoid with the power lines L-1 and L-2 through wires 424, 426 and 428. Wires 430 and 432 connect a terminal of the relay 422 with the power line L-2 so that when the switch 244 is closed, the relay is closed and the solenoid 342 is energized to shift the valve 334 for directing hydraulic fluid under pressure into the head end of the cylinder 82.

As mentioned above, the electric clutch 162 is deenergized at the start of a honing operation for a predetermined interval of time so as to prevent the reset cylinder 148 from moving in response to operation of the honing stone feeding or ratchet mechanism until after the stones have been fed an amount which is substantially equal to the expected wear of the stones during an entire honing operation. The operation of the electric clutch 162 is controlled by an electric timer 434 of known commercially available construction which is adapted to reset itself at the completion of each honing operation. The timing switch means of the timer 434 has one terminal connected to the line L-1 by a wire 436 and another terminal connected to the electric clutch by wire 438, relay 440, wire 442, pressure switch 444 and wire 446. The other terminal of the electric clutch is connected by wires 448, 450 and 452 and the relay 440 and pressure switch 444 to the power line L-2. The means for energizing and starting the timer 434 is connected to the wire 412 by a wire 454 and to the power line L–2 by wire 456 so that when the switch 244 is closed, the timer is energized to open the electric clutch circuit in the first instance and then close the electric clutch circuit after the passage of a predetermined time interval. Since the switch 244 is closed at the start of a honing operation in the manner described above, the de-energization of the electric clutch also occurs at the start of the honing operation.

A size ring 458 which is diagrammatically indicated in broken lines in FIG. 16 is slidably mounted on the honing tool spindle and is resiliently biased downwardly in a known manner so that it will engage the top of a workpiece during a honing operation and enter the workpiece bore when the bore has been honed to the proper size. A finger 460 is carried by the size ring for actuating and closing a switch 462 when the size ring enters the workpiece bore, which switch controls stopping and resetting of the apparatus. More specifically, one terminal of the switch 462 is connected with the power line L–1 by a wire 464 and a second terminal of this switch is connected by a wire 466 with the relay 422 for operating the relay so as to de-energize the solenoid 342 and thereby permit the valve 334 to shift for directing hydraulic fluid under pressure into the lower or rod end of the cylinder 82 while relieving the pressure in the upper end of this cylinder for rapidly retracting or disengaging the honing stones from the workpiece. The second terminal of the switch 462 is also connected with the solenoid 134 by a wire 468, which solenoid is connected with the power line L–2 by a wire 470 so that upon closing of the switch 462, the solenoid 134 is energized to retract the locking dog 126 from the ratchet wheel for permitting resetting of the ratchet mechanism. The wire 468 is also connected by wires 472 and 474 to a solenoid 476 having a second terminal connected with the power line L–2 by a wire 478. The solenoid 476 is mechanically linked with the valves 218 and 220 so that when this solenoid is energized, these valves will be positioned for raising the head 38 and retracting or shifting the ratchet operating piston 114 fully toward the left as viewed in FIGS. 8 and 9 regardless of the moment in the up-and-down cycle of movement of the head 38 in which the size ring enters the workpiece. The wire 472 is also connected with the wire 400 so that when the switch 462 is closed, the solenoids 380 and 382 will be energized to operate the air cylinders 208 and 210 for turning the control rod 174 to a position in which the finger 186 will pass upwardly through a notch in the dog 178.

When the control rod 174 is turned to the position mentioned in the preceding paragraph, the dog 180 is located for engagement with the finger 186 and the finger 236 on the control rod is located for actuating and closing the switch 248. The dog 180 is located so that when the head 38 is raised sufficiently fully to retract the honing tool from the workpiece and to position the expandable stone assembly in the guide 56, the dog 180 will be engaged by the finger 186 and the control rod will be raised to actuate and close the switch 248. The switch 248 has one terminal connected to the wire 408 and a second terminal connected by wires 480, 482 and 484 with the solenoid 258, which solenoid has a second terminal connected with the power line L–2 by a wire 486. The solenoid 258 is associated with the dump valve 256 so that when the switch 248 is closed and the solenoid is energized, the dump valve 256 is opened for interrupting the supply of hydraulic fluid under pressure to the cylinders 46 and 48 and thereby terminating movement of the head 38. The wire 480 is also connected by a wire 488 to the relay 414 for operating this relay so as to de-energize the motor 74. An extension of the wire 488 is connected with the pressure switch 444 which, in turn, is connected to the solenoid 348 by a wire 490 so that when the switch 248 is closed, the solenoid 348 is energized and the valve 343 is shifted for directing hydraulic fluid under pressure to the reset cylinder 148 for shifting the cylinder toward the right as viewed in FIG. 5 and thereby resetting the honing stones. When the end of this cylinder engages the piston 150, the hydraulic pressure building up within the cylinder opens the pressure switch 444 which functions to de-energize both the solenoid 348 and the electric clutch 162. The honing tool is now stopped, reset and positioned so that after the finished workpiece has been replaced by a new workpiece to be honed, a honing cycle may be started by pressing the start button 394. A relay switch 492 connecting the wires 482 and 484 and connected to the wires 396 and 398 by wires 494 and 496 is operated to de-energize the solenoid 258 and close the dump valve 256 so that hydraulic fluid is again delivered to the cylinders 46 and 48. It is understood that when the control rod 174 was raised upon engagement of the finger 186 with the dog 180, the pilot 218 was shifted for directing the hydraulic fluid to the cylinders 46 and 48 so that the head 38 will start downwardly upon closing of the dump valve 256.

A rod 498 is carried by the cylinder 82 and has an upper dog 500 secured thereto for actuating and closing a switch 502 mounted on the head 38 when the cylinder 82 has been fed downwardly to a predetermined lower limit at which the honing stones have become sufficiently worn so as to require replacement. A warning light 504 mounted at any convenient location is connected between wires 506 and 508 extending from the line L–1 to the switch 502, which switch is also connected with the line L–2 by wire 510 so that the light is illuminated to provide the operator with an indication that the honing stones should be replaced. When the light 504 is illuminated, the operator presses a push button switch 512 on the control panel 392 so that the hydraulic cylinder 82 is shifted upwardly and the honing stone assembly is fully collapsed for permitting replacement of the stones. More specifically, the switch 512 is connected by a wire 514 with the timer 434 for energizing the timer so as to close a switch thereof connected with a wire 512 after the passage of a predetermined time interval. This switch has one terminal connected with the wire 514 by wire 516 and another terminal connected by a wire 518 to a relay 520 for completing a circuit through the relay and wires 522 and 524 to the line L–2. A switch of the relay has one terminal connected to the wire 464 by a wire 526 and another terminal connected to the solenoid 326 by a wire 528, which solenoid is also connected by wires 530, 532 and 534 with the line L–2. When the timer switch is closed, the relay 520 is operated so as to energize the solenoid 326 to shift the valve 314 for operating the hydraulic motor 168 so as to drive the worm shaft for raising the cylinder 82.

The wire 514 is also connected with the relay 440 by a wire 536 so that when the push button switch 512 is closed, the relay 440 is operated to de-energize the electric clutch 162. The wire 536 is also connected with the ratchet locking dog solenoid 134 by a wire 538 which is also connected with the solenoid 476 by a wire 540 so that when the push button 512 is pressed, these solenoids are operated respectively for retracting the locking dog from the ratchet wheel and for shifting the valve 220 so that the ratchet cylinder 116 is operated for retracting the pawl 106 from the ratchet wheel as shown in FIG. 9. It will be appreciated that the timer delays operation of the fluid motor until the electric clutch has been de-energized and the solenoids 134 and 476 have been energized and the ratchet pawl and locking dog have been retracted from the ratchet wheel. When the cylinder 82 reaches its uppermost position, a dog 542 on the rod 498 closes a switch 544 on the head 38. This switch has one terminal connected with the wire 524 and another terminal connected with the relay 520 by wires 546 and 548. A circuit through the relay connected with the wire 548 is also connected with wires 550 and 552 to a light 554 which, in turn, is connected with the line L–1 by wire 556. Thus, when the switch 544 is closed, the relay 520 is operated to de-energize the solenoid 326 for permitting shifting of the valve 314 to a neutral position which stops the fluid motor, and at the same time the light 554 is illuminated to inform the operator that the honing stones are fully retracted so that they may be replaced.

When originally setting up the apparatus or after the honing stones have been replaced, it is often desirable to feed the hydraulic cylinder 82 downwardly rapidly to expand partially the honing stones to a position from which they may be shifted substantially into engagement with the work by operation of the piston 80 within the cylinder 82. This is accomplished by reversing the fluid motor 168. More specifically, a push button switch 543 is provided in the control panel 392 from which a wire 545 extends. This wire is connected by a wire 547 with the relay 440 for operating the relay so as to insure disengagement of the electric clutch 162 and also to the solenoids 134 and 476 by wires 549 and 551 for energizing these solenoids so as to insure disengagement of the ratchet pawl and locking dog from the ratchet wheel. The wire 545 is also connected with the timer 434 for energizing the timer so that after the passage of a suitable time interval, a switch thereof is closed. This switch has one terminal connected with the wire 545 by a wire 553 and another terminal connected by a wire 555 with a solenoid 328 which is also connected with the wire 532 by a wire 557. Thus, when this timer switch is closed, the solenoid 328 is energized to shift the valve 314 for operating the fluid motor in a direction which lowers the cylinder 82.

When the honing stones are to be replaced, the stone assembly is fully retracted or collapsed in the manner described above, and the head 38 is moved upwardly sufficiently to raise the honing tool above the guide 56. In order to permit this, the air cylinders 208 and 210 are operated so as to turn the control rod 174 to permit the finger 186 to pass through a notch in the control dog 180 so that the head will continue to rise until the finger engages the dog 182. Suitable electrical control means, not shown, which need not be described is provided for raising the head 38 to permit replacement of the honing stones and also for subsequently lowering the head to a position from which the honing operation may be started. A stop switch 558 is provided on the control panel 392 and is connected with the relay 390 by wires 560 and 562 for operating the relay 390 to de-energize the hydraulic pump motors whenever it is desired to completely shut down the apparatus at the end of the honing operation.

Referring now particularly to FIGS. 17 through 22, there is partially shown an apparatus 564 embodying a modified form of the present invention, which apparatus 564 is similar to the apparatus described above, and the principal difference is found in the head assembly 566 which corresponds to the head 38 described above but includes a plurality of honing tools or spindles 568, 570, 572, 574, 576, 578, 580 and 582. These spindles are divided into two groups so that the apparatus is adapted simultaneously to hone the bores in two workpieces such as the cylinder bores in a pair of engine blocks. A drive shaft 584 corresponding to the drive shaft assembly described above is provided for driving the spindles 568 through 574. More specifically, a gear 586, see FIGS. 18 and 21, is secured to the shaft 584 and meshes with a gear 588 on the upper end of a rotatably supported shaft 590. A gear 592 on the lower end of the shaft 590 meshes with a pair of oppositely disposed gears 594 and 596, which gears respectively drive gears 598—600 and 602—604 on the spindles 568—570 and 572—574. A second drive shaft 606 is provided for driving the spindles 567 through 582, and the gearing between the spindles and the shaft 606 is substantially identical to the gearing just described.

The head assembly 566 includes means for feeding and resetting the honing stones of the various honing tools in substantially the same manner as the honing stones of the apparatus described above are fed and reset, but, of course, the feeding and resetting means is modified for accommodating the plurality of honing tools. In addition, the feeding and resetting means is constructed so that the honing stones of each honing tool are controlled independently of the honing stones of the other tools in a manner which enables the honing stones of each tool to be disengaged or retracted from the bore surface when the size ring of each tool enters the bore regardless of whether or not the size rings of the remaining tools have entered the remaining bores. This is important since it will be appreciated that the honing operations for the various bores normally will not be completed at the same instant so that the honing operation in certain of the bores should be terminated while the honing operation continues in other of the bores.

As shown best in FIG. 21, the honing stone feeding and resetting for the spindle 568 comprises a hydraulic cylinder 608 and cooperable piston 610 for shifting the stone actuating rod 612 of the spindle, and a worm wheel 614 threadedly receiving the cylinder, which cylinder, piston and worm wheel are substantially identical to the cylinder 82, piston 80 and worm wheel 88 described above. As indicated in FIG. 17, the remaining spindles or honing tools are respectively provided with identical hydraulic cylinders 616, 618, 620, 622, 624, 626 and 628 and with identical worm wheels 630, 632, 634, 636, 638, 640 and 642. A worm shaft 644 traverses the forward portion of the head assembly 566 and carries worms 646, 648, 650, 652, 654, 656, 658 and 660, respectively, meshing with the worm wheels. It is to be noted that the worms are freely rotatable on the shaft 644 and are provided with clutch faces cooperable with separate clutch members non-rotatably but slidably disposed on the shaft 644 of which clutch members only members 662, 664 and 676 are shown. Linkage means 678 is provided for axially shifting the clutch member 662 into and out of engagement with the worm 646, which linkage means is selectively actuated in opposite directions by solenoids 680 and 682. Similar linkage and solenoid means which need not be described in detail are provided for shifting each of the remaining clutch members into and out of engagement with its associated worm for selectively providing a driving connection between the worms and the shaft 644 and for breaking the driving connection between the worms and the shaft.

Figure 19:
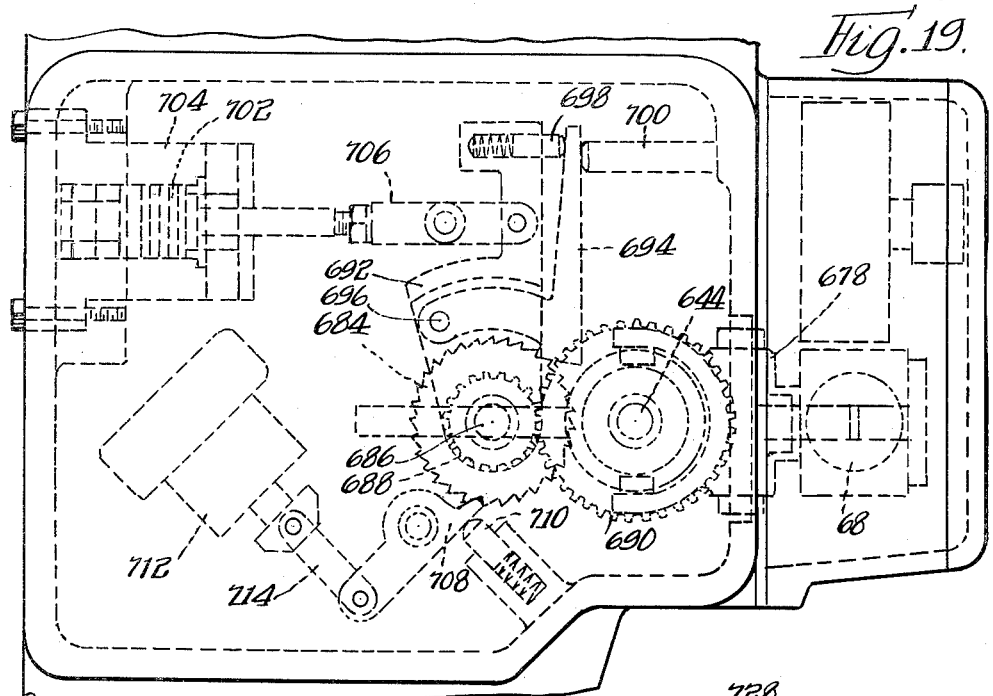
FIG. 19 is an enlarged elevational view taken along line 19—19 in FIG. 18.

Referring particularly to FIGS. 18 and 19, there is shown a ratchet honing stone feeding mechanism which is essentially identical to the corresponding mechanism of the apparatus described above. More specifically, a ratchet wheel 684 is fixed on a stub shaft 686 that also carries a pinion 688. The pinion 688 meshes with a gear 690 on the worm shaft 644 so that the worm shaft is driven in response to movement of the ratchet wheel. A lever 692 is pivotally mounted on the ratchet wheel shaft, and a pawl member 694 is pivoted to the lever as at 696 and is normally yieldably biased in a clockwise direction with respect to the lever as viewed in FIG. 19 by a spring pressed pin 698. A fixed stop or abutment 700 which corresponds to the stop member 124 described above limits movement of the upper end of the pawl member in the clockwise direction. A piston 702 operating within a cylinder 704 is connected to the lever 692 by link means 706 which piston and cylinder correspond to the above described piston and cylinders 114 and 116 respectively and actuate the ratchet mechanism in the same manner. A ratchet wheel locking dog 708 is normally biased into engagement with the ratchet wheel by a spring pressed pin 710 and is adapted to be retracted from the wheel by a solenoid 712 which corresponds to the above described solenoid 134 and has its plunger connected to the locking dog member by a link 714. With this arrangement it is seen that when all of the clutch members 662 through 676 are in engagement with their associated worms, the ratchet mechanism is capable of feeding the honing stones of all of the honing tools in the manner described above with respect to the single spindle apparatus and the feeding movement of the stones may be selectively and independently stopped by disengaging their associated clutch members from the worms.

Figure 20:
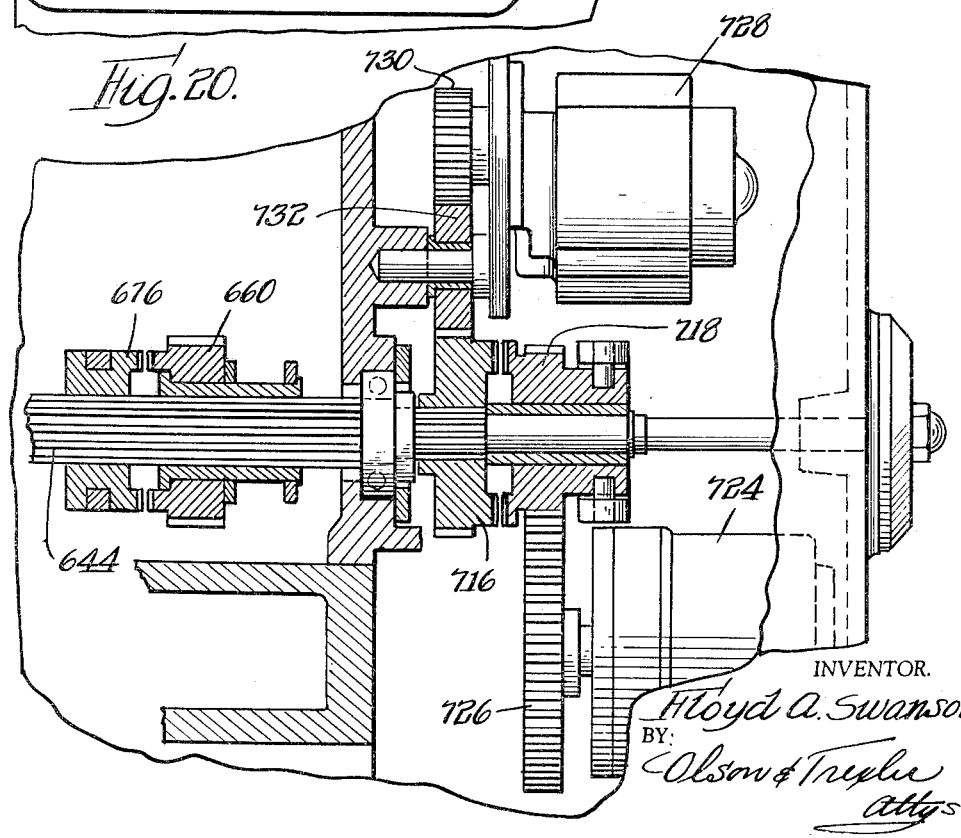
FIG. 20 is an enlarged fragmentary sectional view taken along line 20—20 in FIG. 22.
Figure 23:
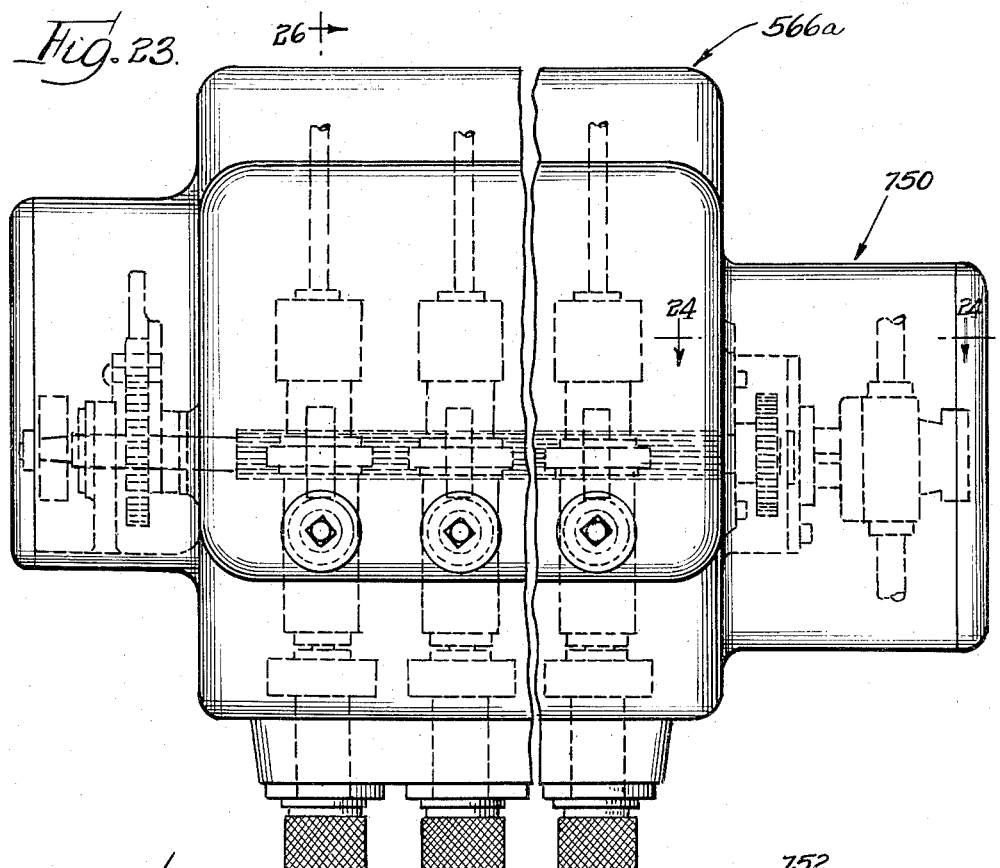
FIG. 23 is a fragmentary elevational view showing a further modified form of the present invention.

In FIGS. 18, 20 and 22 the means for resetting the honing stones at the end of the honing operation of all of the bores in the workpieces is shown. This means includes a gear 716 keyed or otherwise secured to the shaft 644 and having a clutch face cooperable with the clutch face of another gear or clutch member 718 freely rotatable on the shaft. This clutch means corresponds to the electric clutch 162 described above and is controlled by an electric solenoid 720 which is mechanically connected to the clutch member or gear 718 by linkage 722. The solenoid 720 is controlled by an electric timer in the manner described above with respect to the single spindle apparatus for engaging and disengaging the clutch member 718. In this embodiment, a rotary type fluid motor 724 having a gear 726 on its shaft meshing with the gear or clutch member 718 is provided for reversely rotating the worm shaft 644 rather than a cylinder and piston-type fluid motor including the cylinder 148 and piston 150 described above. Another fluid motor 728 which corresponds to the above described motor 168 is provided for rapidly rotating the worm shaft alternatively in opposite directions for either rapidly expanding or contracting the honing stones. This motor has a gear 730 on its output shaft which meshes with an idler gear 732. The idler gear meshes with the clutch assembly gear 716. It is understood that the multiple spindle apparatus will be provided with control circuits similar to those described above for actuating the honing tools in the desired manner.

FIGS. 23–26 show another embodiment which is similar to the structures described above. For illustrative purposes, this embodiment is shown as including a multiple spindle head assembly 566a. Therefore elements of this embodiment which correspond to the embodiments shown in FIGS. 17 through 22 are designated by the same reference numerals with the suffix "a" added. However, it is to be understood that many features of this embodiment may also be utilized in a single spindle honing machine. One important difference of the embodiment shown in FIGS. 23–26 over the embodiments described above is in the construction of means 750 for initially rapidly feeding and then resetting the honing stones. In the embodiment shown in FIGS. 1–16, this means is provided, in part, by the hydraulic motor 168, the magnetic clutch 162 and the cylinder 148. The corresponding means is provided, in part, in the multiple spindle structures shown in FIGS. 17–22 by the fluid motors 724 and 728 and the magnetic clutch 718.

In this embodiment the feeding and resetting means 750 is substantially simplified and is constructed so that it requires little attention or adjustment by an operator after the apparatus has been initially set up. More specifically, the feeding and resetting means 750 includes a reversible positive displacement hydraulic motor 752 having a rotatable output shaft to which a pinion 754 is secured. The pinion 754 meshes with a gear 756 keyed or otherwise fixed on an end of the worm shaft 646a. It will be appreciated that the fluid motor 752 may be driven selectively in opposite directions for rotating the worm shaft 646a either to expand or contract the honing tools associated with the various spindles in the manner discussed more fully above.

Figure 25:
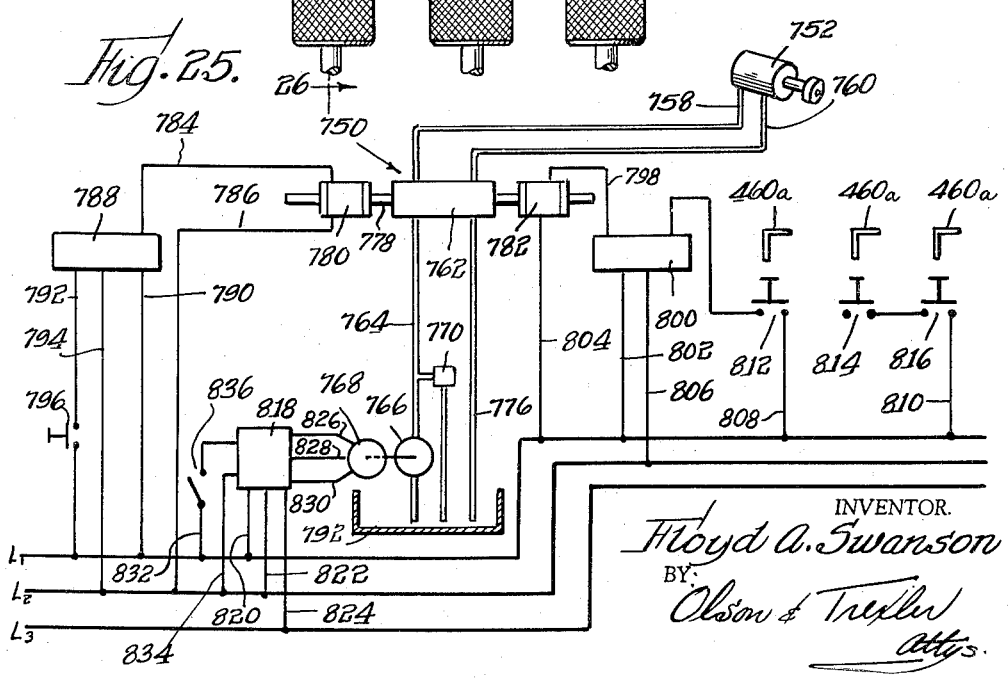
FIG. 25 is a diagrammatic view of control means included in the embodiment of FIGS. 23 and 24.

As shown diagrammatically in FIG. 25, the motor 752 is connected by conduits 758 and 760 to a control valve 762. Metered hydraulic fluid under pressure is supplied to the control valve 762 through a conduit 764 which is connected with an outlet of a pumping and metering device 766 which is driven by an electric motor 768 or any other suitable means. A relief valve 770 is connected with the conduit 764 for passing fluid back to a reservoir 772 through conduit 774 when the control valve 762 is shifted so as to prevent the flow of fluid from the conduit 764 to the motor 752. The control valve 762 has a drain port which is connected with the reservoir by a suitable conduit 776.

The control valve 762 is a three-position valve which may be of known construction so that it need not be described in detail. It suffices to state that the valve may include an axially shiftable spindle or valve member 778 which is normally biased to a first or neutral position in which the fluid supply conduit 764 is blocked and the conduits 758 and 760 are connected with each other through the valve structure. This enables the worm shaft to be rotated by the ratcheting means of the apparatus during a honing operation in the manner described above. The valve structure may be provided with any suitable means such as internally disposed spring means, not shown, for biasing the spindle 778 to the neutral position.

The spindle 778 is also connected with solenoids 780 and 782. The construction is such that when the solenoid 780 is energized, the spindle 778 is shifted toward the left as viewed in FIG. 25 so that the conduit 758 is connected with the fluid pressure supply conduit 764 and the conduit 760 is connected with the drain conduit 776. This causes the fluid motor 752 to be driven in an appropriate direction for rotating the worm shaft to expand the honing tools. When the solenoid 782 is energized, the spindle 778 is shifted toward the right so that the conduit 760 is connected with the fluid supply conduit 764 and the conduit 758 is connected with the drain conduit whereby rotation of the fluid motor is reversed to cause collapsing of the honing tool. The pumping and metering device is driven so as to provide a substantially constant flow of fluid to the motor 752 so that the motor will be driven at a predetermined uniform rate. Therefore, the solenoids 780 and 782 may, in accordance with the feature of this embodiment, be energized for predetermined periods of time so that the motor 752 will selectively function to expand or radially collapse the honing tools a predetermined amount.

The solenoid 780 is connected by wires 784 and 786 with one contact of switch means of a suitable timer 788 and with a power line L–2 respectively. Another contact of this switch means of the timer is connected with a power line L–1 by a wire 790. The timer is provided with suitable energizing circuit means including wires 792 and 794 respectively connected with the power lines L–1 and L–2. A momentary contact switch 796 is provided in the wire 792. The construction of the timer is such that when the switch 796 is closed, the timer will be energized so as to close the switch means, not shown, between the wires 784 and 790 so that the solenoid 780 will be energized for a predetermined time interval.

The solenoid 782 has one lead connected by a wire 798 with another timer 800 similar to the timer 788. The power circuit of the timer 800 is connected with the power line L–1 by a wire 802, and another wire 804 is provided between the solenoid 782 and the power line L–2 for completing the power circuit. The control circuit of the timer 800 has one lead connected with the power line L–2 by a wire 806 and another lead connected to the power line L–1 by wires 808 and 810 and a plurality of series connected momentary contact limit switches 812, 814 and 816. The switches 812, 814 and 816 and any additional similar switches which may be required are respectively associated with the various honing tools of the head assembly 566a. These switches are adapted to be closed by fingers 460a connected with size rings, not shown, associated with each of the honing tools so that when the honing operation of all of the tools has been completed, the timer control circuit of the timer 800 will be energized. This in turn causes the solenoid 782 to be energized for a predetermined interval of time. The timer 800 is adjusted so that the motor 752 will be operated in a reverse direction an interval of time which is sufficient to cause the honing tools to be retracted or radially collapsed an amount slightly less than the amount which the tools were fed or radially expanded by the ratcheting means of the apparatus during a honing operation. Thus the honing stones are reset to positions in a manner which compensates for wear of the stones. The timer 788 is adjusted so that when the switch 796 is closed, the timer 788 will cause the motor 752 to be operated in a forward direction an interval of time which is sufficient to advance or expand the honing stones from their retracted or reset positions to positions substantially in engagement with the workpieces.

Any suitable means may be provided for energizing the pump motor 768. This means may include a relay 818 connected to the power lines L-1, L-2 and L-3 by wires 820, 822 and 824, respectively, and also connected with the pump motor by wires 826, 828 and 830. A relay control circuit is connected with the power lines L-1 and L-2 by wires 832 and 834 and is adapted to be closed or opened by switch means 836 connected in the wire 832. It is understood, of course, that the control means shown in FIG. 25 is only a portion of the entire control means for the apparatus and is to be incorporated into control circuit means such as that shown in FIGS. 15 and 16 which, of course, would be suitably modified.

Figures 24, 26:
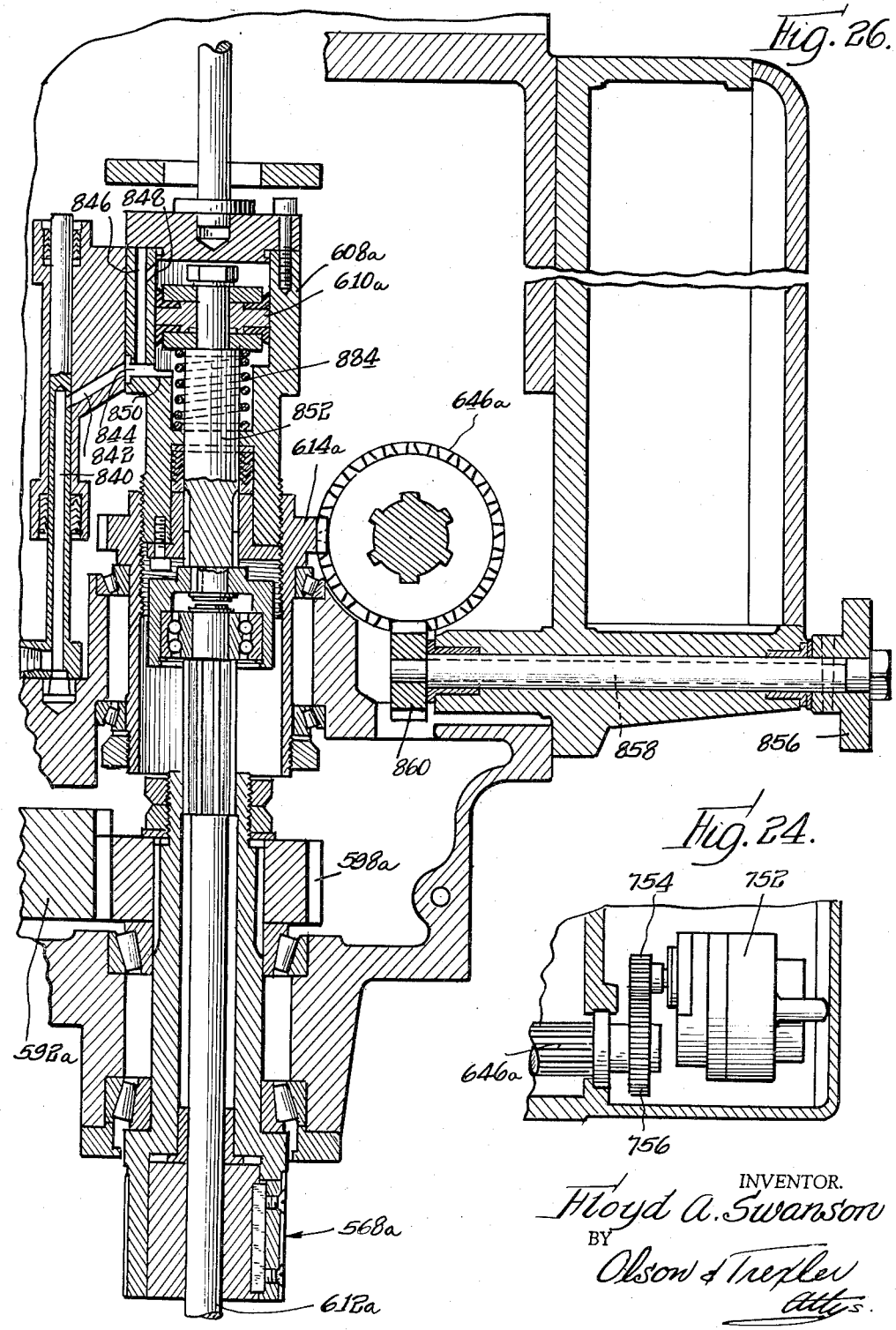
FIG. 24 is a fragmentary sectional view taken along line 24—24 in FIG. 23.
FIG. 26 is an enlarged fragmentary partial sectional view taken along line 26—26 in FIG. 23.

Referring to FIG. 26, it is seen that the cylinders 608a and 610a differ from the corresponding elements of the structure described above. More specifically, hydraulic fluid under pressure is supplied to the cylinder 608a through suitable passageways 840 and 842. An inlet 844 in the cylinder 608a is connected with an upper end of the cylinder by passageways 846 and 848. It is also to be noted that the inlet is connected with the lower end of the cylinder by a passageway 850. Thus hydraulic fluid under pressure is admitted to both ends of the cylinder, but since the upper end of the piston has the largest effective area as a result of the rod 852 connected to the lower end of the piston, the hydraulic fluid under pressure will force the piston downwardly. A compression spring 854 is provided between a seat in the cylinder and the lower end of the piston. Thus, when the pressure on the hydraulic fluid is relieved, the spring will rapidly return the piston to its uppermost position. It is to be noted that since the lower end of the cylinder is connected with the fluid inlet passageway 844, fluid from the upper end of the cylinder will flow into the lower end of the cylinder during raising of the piston so as to eliminate any vacuum in the lower end of the cylinder which might retard the upward movement of the piston. In addition, the fluid in the lower end of the cylinder will supplement fluid delivered from a pressure source to the upper end of the piston during downward movement of the piston so as to reduce the amount of fluid which must be delivered from the pressure source and promote more efficient operation of the apparatus. In order to provide an indication of the amount which the honing tools have been expanded and therefore the amount of wear of the honing stones, dials 856 are provided in association with each of the honing spindles which dials are respectively mounted on shafts 858 having worm wheels 860 secured to inner ends thereof for meshing engagement with the worm shaft.

While the preferred embodiments of the present invention have been shown and described herein, it is obvious that many structural details may be changed without departing from the spirit and scope of the appended claims.

The invention is claimed as follows:

1. In an apparatus for machining a workpiece surface with tool means adapted to be fed into engagement with and retracted from a workpiece surface, the combination comprising hydraulic piston-cylinder means for initially shifting the tool means from a retracted position a predetermined amount to an initial advanced position, said piston-cylinder means including a cylinder having a helically threaded section, a rotatable member fixed against axial displacement threadedly engaging said threaded cylinder section, and means for intermittently driving said rotatable member in predetermined increments for bodily shifting said piston-cylinder means for feeding the tool means intermittently in predetermined increments.

2. In an apparatus for machining a workpiece with tool means adapted to be fed into engagement with and retracted from the workpiece, the combination comprising expansible hydraulic means for initially shifting the tool means from a retracted position to an initial advanced position, positive mechanical means connected to said hydraulic means for subsequently feeding the tool means from said advanced position, tool means resetting motor means, means including clutch means for driving said reset motor means in response to said feeding means during feeding movement of the tool means, said reset motor means being reversely operable an amount it is driven during feeding movement of the tool means for resetting the tool means, and means for operating said clutch means during feeding of the tool means for preventing movement of said reset motor means for a predetermined interval so that the movement of the reset motor means is such as to reset the tool means in a manner which allows for wear of the tool means.

3. In an apparatus for honing a bore in a workpiece with tool means including an expandable honing stone assembly and an axially shiftable rod for selectively expanding the honing stone assembly upon movement in one direction and permitting collapsing of the honing stone assembly upon movement in the opposite direction, the combination comprising fluid motor means for initially shifting said rod a predetermined amount in said one direction from a retracted position to an advanced position, said fluid motor means including an externally threaded body section, and means for subsequently bodily shifting said motor means in said one direction intermittently and in substantially predetermined increments for further shifting said rod in said one direction intermittently and in substantially predetermined increments, said last named means including an internally threaded wheel into which said externally threaded body section of said motor means is threaded and having peripheral worm gear teeth, a worm meshing with said worm gear teeth, and ratchet means for driving said worm intermittently in substantially predetermined increments.

4. A honing apparatus, as defined in claim 3, wherein means is connected with said worm for providing an indication of the position of the worm and thereby providing an indication of the amount the honing stones have been fed.

5. An apparatus for honing a bore in a workpiece with a honing tool including an expandable honing stone assembly and a shiftable rod for expanding the honing stone assembly when it is moved in one direction and for permitting collapsing of the honing stone assembly when it is moved in an opposite direction, comprising main frame means, a head assembly reciprocably mounted on said main frame means for carrying a honing tool for reciprocable movement with respect to a workpiece, said head assembly including reciprocable hydraulic motor means for initially shifting said rod in said one direction from a retracted position a predetermined amount to an advanced position, stop means for positively limiting operation of said hydraulic motor means for moving said rod in said one direction, said hydraulic motor means including a helically threaded body section, an internally threaded annular worm wheel threadedly engaging said body section for bodily shifting said hydraulic motor means upon rotation of the worm wheel, a worm meshing with said worm wheel, ratchet means operatively connected with said worm for intermittently turning said worm in predetermined increments for bodily shifting said hydraulic motor means intermittently in predetermined increments in said one direction for further shifting said rod in said one direction for feeding the honing stone assembly, fluid motor means for actuating said ratchet means, means including additional fluid motor means operatively connected with said worm for reversely turning the worm at the end of a honing operation for partially bodily retracting said hydraulic motor means to shift said rod in said opposite direction sufficiently to reset the honing stone assembly for a subsequent honing operation with allowance for honing stone wear, a reversible fluid motor operatively connected with said worm for selectively driving said worm in opposite directions for relatively rapidly bodily shifting said hydraulic motor selectively in opposite directions for facilitating initial set up of the apparatus, and control means for the head assembly including a control rod reciprocably mounted on said main frame and including a helically threaded section having longitudinally extending flute means therein, a control dog adjustably threaded onto said control rod section, pin means on said dog retractably projecting into said flute means for positively locking said dog with respect to said control rod, and finger means projecting from said head assembly for engaging said control dog and shifting the control rod during reciprocable movement of the head assembly.

6. In an apparatus for honing a workpiece surface with a tool having expandible honing elements adapted to be expanded into engagement with and retracted from the workpiece surface, the combination comprising expansible piston-cylinder means for initially expanding the honing elements from retracted position a predetermined amount to an initial expanded position, means mounting the cylinder of said piston-cylinder means for bodily movement in the honing element expanding direction, and means for subsequently expanding the honing elements intermittently and in substantially predetermined increments, said last named means comprising power means, a stepping pawl and ratchet means connected to and actuated by said power means, and gearing connected to and driven by said pawl and ratchet means and connected to said cylinder incrementally and intermittently to move said cylinder in said mounting means in the honing element expanding direction.

7. The combination set forth in claim 6, including stop means limiting the expansion of said expansible piston-cylinder means, and means connecting said piston-cylinder means to a source of pressure at a predetermined value so that the honing elements are maintained against the workpiece surface with a substantially constant predetermined pressure which is responsive to the pressure applied to said piston-cylinder means.

8. The combination claimed in claim 6, wherein said expansible piston-cylinder means includes means for relieving any undue pressure which may build up between the honing elements and the workpiece during a honing operation.

9. In an apparatus for honing a workpiece surface with a tool having expandible honing elements adapted to be expanded into engagement with and retracted from a workpiece surface, the combination comprising expansible piston-cylinder means for initially expanding the honing elements from a retracted position a predetermined amount to an initial expanded position, means mounting the cylinder of said piston-cylinder means for bodily movement in the honing element expanding direction and in the reverse direction, positive mechanical means connected to said cylinder for subsequently moving said cylinder intermittently in predetermnied increments in the honing element expanding direction, and means connected to said cylinder for subsequently reversely moving the latter a distance less than the total distance that it was incrementally moved, whereby the honing elements are retracted a distance less than the total distance the honing elements were intermittently and incrementally expanded from the initial expanded position for resetting the honing elements for engagement with a second workpiece with allowance for wear of the honing elements.

10. In a honing machine having a honing tool assembly wherein the honing elements are adapted to be expanded into engagement with and retracted from a workpiece surface, the combination comprising hydraulic piston-cylinder means for initially shifting the honing elements from a retracted position to an initial expanded position, means mounting the cylinder of said piston-cylinder means for bodily movement in the honing element expanding and retracting directions, gear means drivingly connected with said cylinder of said piston-cylinder means for bodily shifting said cylinder in said mounting means, and positive mechanical, hydraulically actuated means connected with and for actuating said gear means for bodily shifting said piston-cylinder means for expanding the honing elements from said initial expanded position.

11. The combination set forth in claim 10, wherein said positive mechanical, hydraulically actuated means for actuating said gear means includes means for intermittently shifting said piston-cylinder means in the honing element expanding direction in predetermined substantially equal increments.

References Cited in the file of this patent

UNITED STATES PATENTS

| Number | Name | Date |
|---|---|---|
| 1,225,745 | Barnes | May 15, 1917 |
| 1,760,605 | Pearmain | May 27, 1930 |
| 1,932,969 | Hopkins | Oct. 31, 1933 |
| 2,073,518 | Hirvonen | Mar. 9, 1937 |
| 2,114,389 | Kingsbury | Apr. 19, 1938 |
| 2,268,028 | Fairbairn | Dec. 30, 1941 |
| 2,270,590 | Johnson | Jan. 20, 1942 |
| 2,349,786 | Flygare | May 23, 1944 |
| 2,377,310 | Caldwell | June 5, 1945 |
| 2,386,901 | Klein | Oct. 16, 1945 |
| 2,758,426 | Comstock | Aug. 14, 1956 |
| 2,819,566 | Johnson | Jan. 14, 1958 |